(12) United States Patent
Nisenzon

(10) Patent No.: US 10,326,981 B2
(45) Date of Patent: *Jun. 18, 2019

(54) GENERATING 3D IMAGES USING MULTI-RESOLUTION CAMERA SET

(71) Applicant: Semyon Nisenzon, Palo Alto, CA (US)

(72) Inventor: Semyon Nisenzon, Palo Alto, CA (US)

(73) Assignee: Semyon Nisenzon, Palo Alto, CA (US)

( * ) Notice: Subject to any disclaimer, the term of this patent is extended or adjusted under 35 U.S.C. 154(b) by 247 days.

This patent is subject to a terminal disclaimer.

(21) Appl. No.: 14/712,933

(22) Filed: May 15, 2015

(65) Prior Publication Data

US 2016/0337635 A1    Nov. 17, 2016

(51) Int. Cl.
*H04N 7/18* (2006.01)
*H04N 13/271* (2018.01)
*H04N 13/243* (2018.01)

(52) U.S. Cl.
CPC ......... *H04N 13/271* (2018.05); *H04N 13/243* (2018.05)

(58) Field of Classification Search
CPC .................................................. H04N 13/0271
USPC .......................................................... 348/87
See application file for complete search history.

(56) References Cited

U.S. PATENT DOCUMENTS

| | | | | |
|---|---|---|---|---|
| 2003/0190072 A1* | 10/2003 | Adkins | ...................... | G06T 5/50 382/154 |
| 2004/0184160 A1* | 9/2004 | Nishina | ................ | G02B 15/173 359/690 |
| 2004/0201769 A1* | 10/2004 | Yoshikawa | .......... | H04N 5/2253 348/335 |
| 2006/0054782 A1* | 3/2006 | Olsen | ................... | G02B 3/0062 250/208.1 |
| 2010/0141651 A1* | 6/2010 | Tan | ......................... | G06T 7/579 345/420 |
| 2010/0182410 A1* | 7/2010 | Verburgh | .............. | G06T 7/0071 348/51 |
| 2011/0032341 A1* | 2/2011 | Ignatov | .............. | H04N 13/0033 348/51 |
| 2011/0069152 A1* | 3/2011 | Wang | ................... | H04N 13/026 348/43 |
| 2011/0141237 A1* | 6/2011 | Cheng | ................. | H04N 13/026 348/46 |

(Continued)

*Primary Examiner* — Leron Beck
(74) *Attorney, Agent, or Firm* — Prakash Nama; Global IP Services, PLLC

(57) ABSTRACT

Techniques for generating 3D images using multi-resolution camera set are described. In one example embodiment, the method includes, disposing a set of multi-resolution cameras including a central camera, having a first resolution, and one or more multiple camera groups, having one or more resolutions that are different from the first resolution, that are positioned substantially surrounding the central camera. Images are then captured using the multi-resolution camera set. A low-resolution depth map is then generated by down scaling the captured higher resolution image to lower resolution image. Captured lower resolution images are then up-scaled. A high-resolution depth map is then generated using the captured image of the central camera, the up-scaled captured images of the one or more multiple camera groups, and the generated low-resolution depth map. The 3D image of the captured image is then generated using the generated high-resolution depth map and the captured images.

40 Claims, 18 Drawing Sheets

(56) References Cited

U.S. PATENT DOCUMENTS

| | | | |
|---|---|---|---|
| 2011/0188773 A1* | 8/2011 | Wei | G06K 9/40 |
| | | | 382/260 |
| 2011/0285813 A1* | 11/2011 | Girdzijauskas | H04N 13/0011 |
| | | | 348/42 |
| 2012/0141016 A1* | 6/2012 | Wildeboer | H04N 13/0271 |
| | | | 382/154 |
| 2013/0107015 A1* | 5/2013 | Morioka | H04N 13/025 |
| | | | 348/48 |
| 2014/0055621 A1* | 2/2014 | Shirani | H04N 7/18 |
| | | | 348/159 |
| 2014/0146139 A1* | 5/2014 | Schwartz | H04N 13/0018 |
| | | | 348/43 |
| 2014/0153916 A1* | 6/2014 | Kintner | G03B 17/561 |
| | | | 396/419 |
| 2015/0042767 A1* | 2/2015 | Ciurea | G06T 15/20 |
| | | | 348/48 |

* cited by examiner

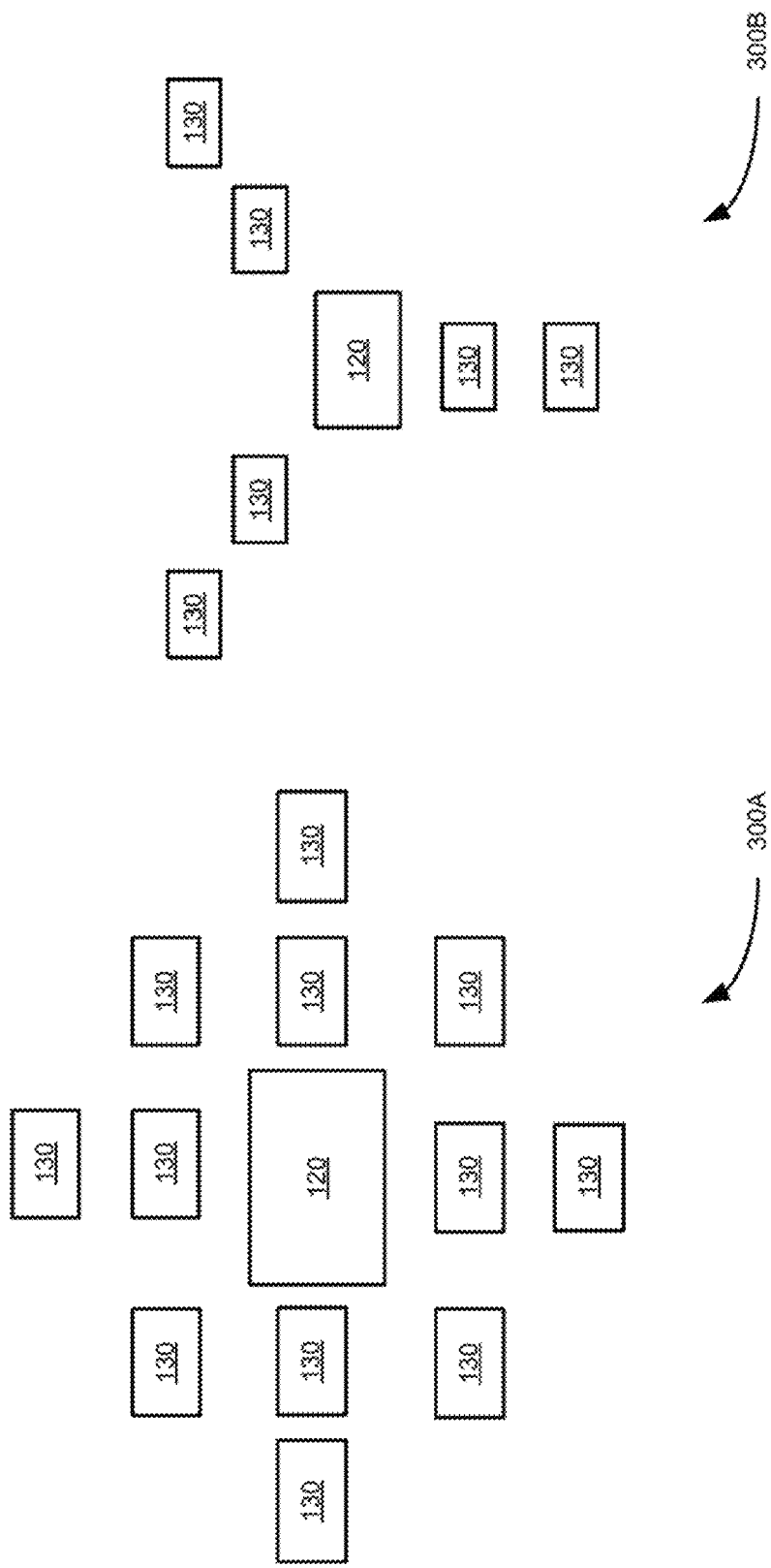

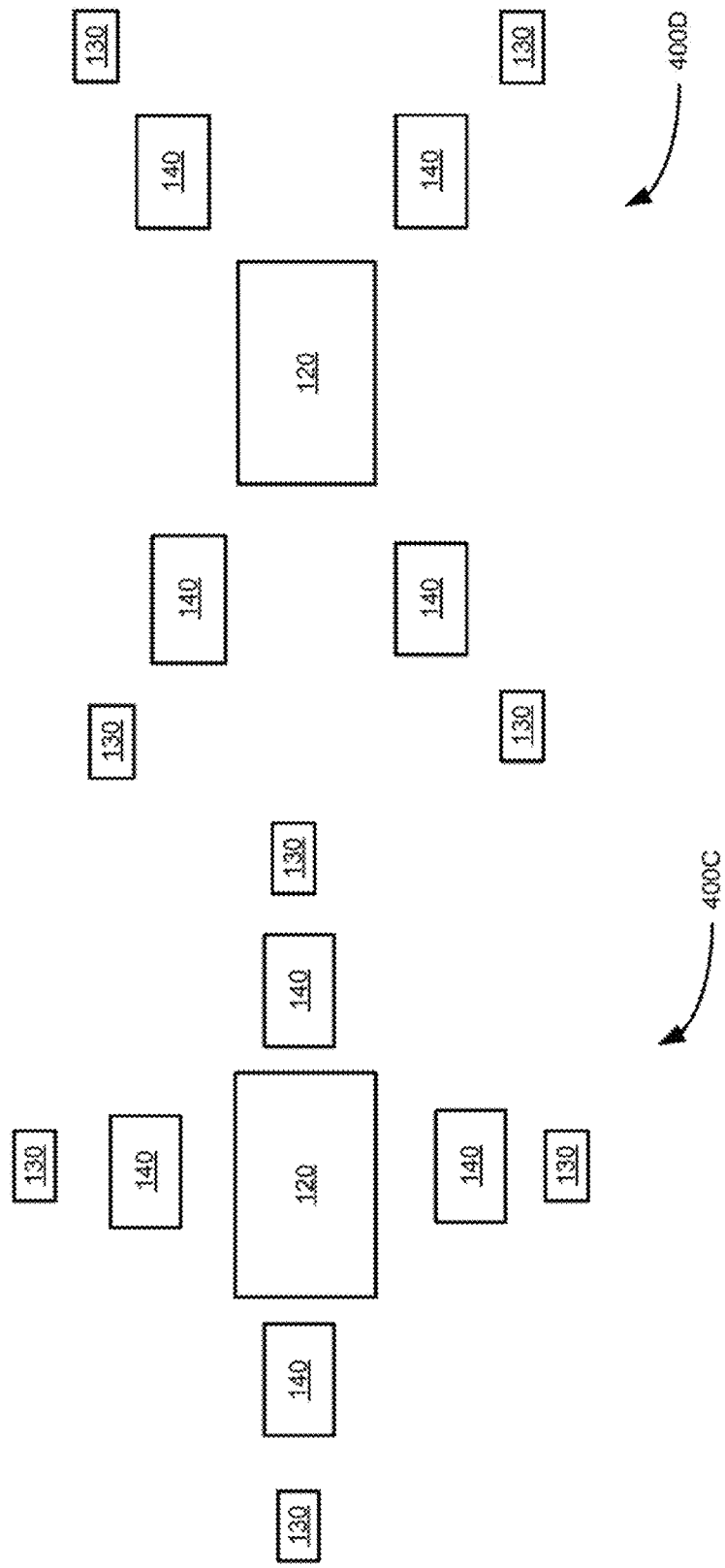

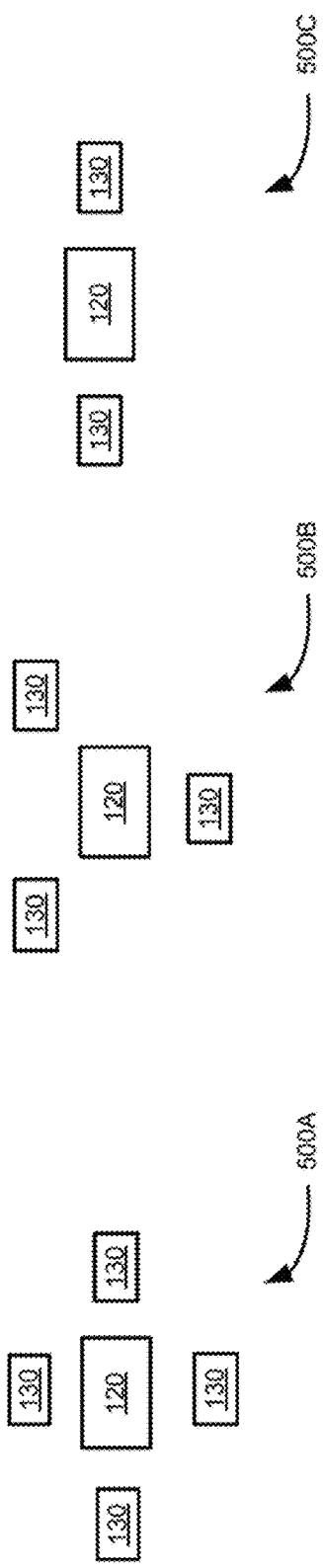

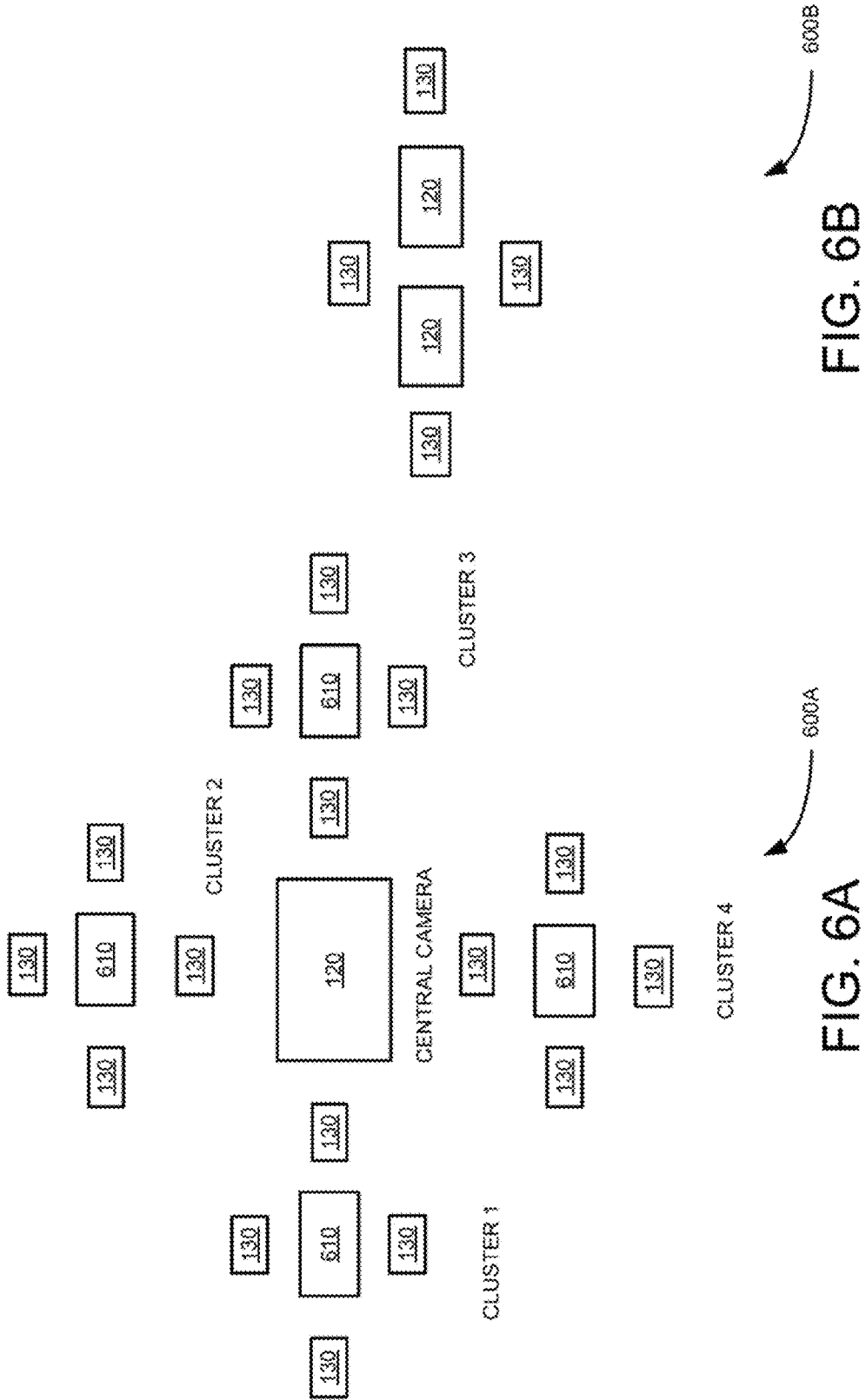

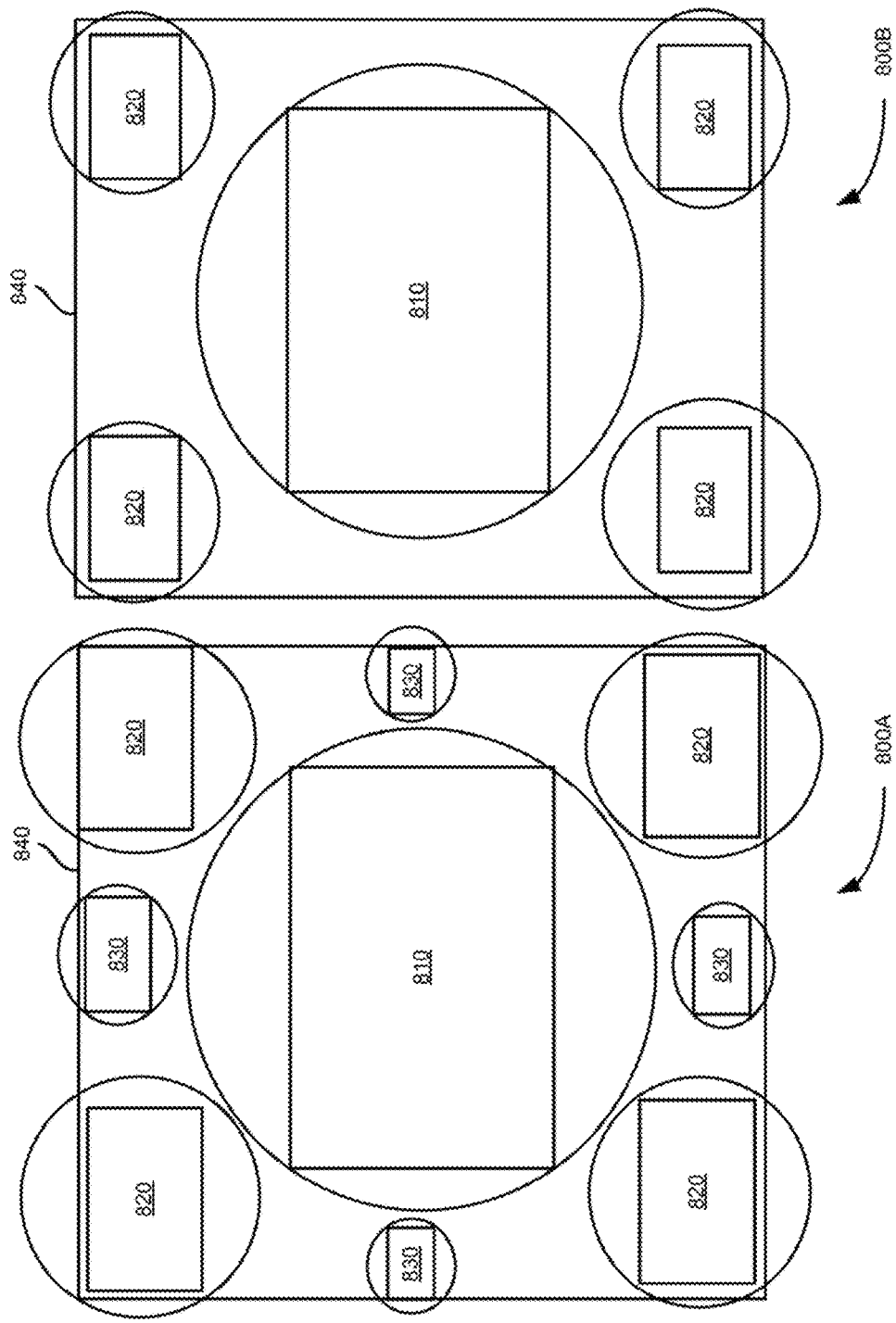

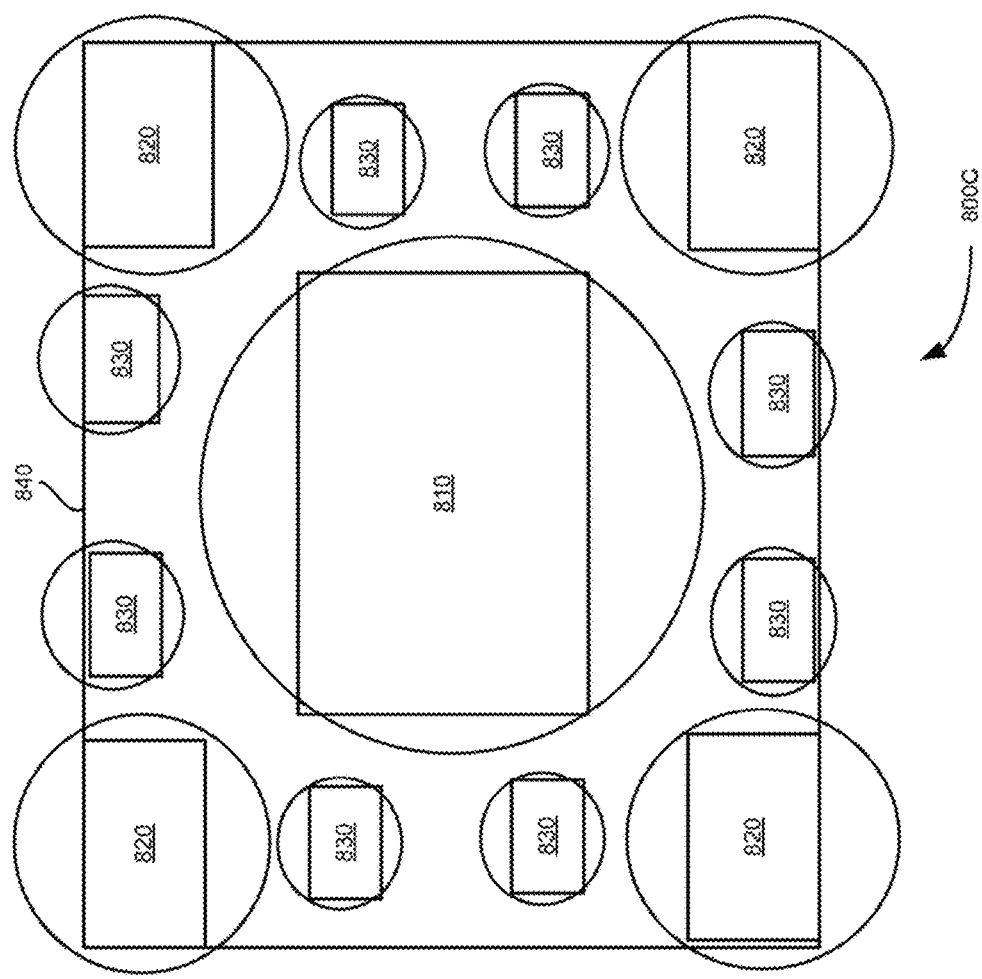

GENERATING 3D IMAGES USING MULTI-RESOLUTION CAMERA SET

BACKGROUND

High quality, computationally-tractable 3D from images is a critical and essential enabler for many application markets. Two human eyes see a scene from different positions, thus giving us a sense of depth oldie scene. The differences between the two views of the scene, called binocular disparity, allow our brain to calculate the depth for every point, on the scene visible by the two eyes. A similar result could be achieved by using two cameras simultaneously capturing the scene and then comparing the two resulting images in order to compute depth information. This could be accomplished by moving individual pixels of one image to match pixels on another image. The degree of movement necessary, called disparity, depends on the distance from the cameras to the object resulting in the particular pixel pair, and also depends on the distance between the two cameras. The goal is to fine tune the best match of pixels from different cameras in order to calculate the most accurate depths.

There are several implementations using large number of cameras organized in two-dimensional arrays. One example implementation is Stanford Multi-Camera arrays. These arrays capture light fields defined as a set of two-dimensional (2D) images capturing light from different directions for the whole scene. Using a larger number of cameras increases the accuracy of the depth map obtained. Another example implementation of camera arrays is the Pelican Imaging system which uses set of low-resolution R, G, and B cameras positioned directly on top of image sensor chip. Both these systems are using lower resolution depth maps in order to obtain higher resolution RGB images, sometimes called super-resolution images.

For traditional cameras, depth of field depends on the so-called F ratio of the lens, which is the ratio of the focal length of the camera lens to the width of the lens aperture. Depending on the F ratio, there can be a particular range of distances from the camera on either side oldie focal plane in which the image is sharp. Because a camera set produces three-dimensional (3D) images, which includes 2D color images plus we can compute the depth for every pixel of the image which called depth map. Using depth map and color image closed to all-in-focus it is possible to generate all in focus image. It is also possible to produce images with different synthetic aperture (level of blurring outside of in focus area), and also to control areas of the image, which are in focus (synthetic depth of field). This could be accomplished at any selected depth after the image had been shut. This feature is being called dynamic refocusing. The maximum synthetic aperture could be defined by size of camera set, synthetic apertures of the individual cameras as well as the accuracy of the generated depth map.

Generally, camera arrays use multiple cameras of same resolution and as a set; camera arrays contain information that allows generating an output image at a resolution higher than the original cameras in the camera array, which is, typically, called as super-resolution images. Generation of super-resolution images by camera arrays have to overcome number of challenges. The most important challenges are: handling of occlusion areas, holes, accuracy and resolution of depth map, total number of computations to be performed (computational complexity), and/or occlusions.

Occlusions are one of the fundamental complications in generation of Super-resolution images using camera arrays are the occlusions. Occlusions are the areas which are seen by some of the cameras, but are not visible from the view of the other cameras because they are in the "shadow" of the other parts of the image (other objects in the image). Depth calculation requires at least two cameras seeing the same pixel. Special handling of occluded zones requires a determination of which cameras see a particular pixel and discarding information from the camera or cameras for which this pixel is occluded. It is possible that some of the pixels are seen by only one camera, and for such pixels depth cannot be determined.

Holes are parts of the image where it is not possible to determine depth map. An example is where there are flat areas in, the image that do not have discernible textures, so there is no specific information within this area that will allow matching of pixels from different cameras, and therefore depth cannot be determined. The other special area is related to some special occlusion cases where there could be pixels which are visible only by central camera. For both of these cases, generation of super-resolution images will tail for some areas of the image and will create holes, which could be filled later with some level of success by quite sophisticated heuristic interpolation methods.

Traditional camera array techniques include using one of the cameras as a reference camera and then for each pixel of reference camera perform parallax shift operation on other cameras in order to determine depth at this pixel. Parallax shift for any given pixel depends on actual 3D position of this pixel and the distance between the cameras. This process usually involves performing parallax shift for number of depths. Conceptually, parallax shift is performed for each of these depths for all participating cameras in the camera array and then so called "cost function" for this depth is being generated. Then the depth with the minimal cost function will be defined as the depth for this pixel. Different implementations are using number of additional techniques for final determination of pixel depth. One of the objectives of these techniques is to find absolute minimum of cost function and to avoid the use of local minimum of cost function as a final depth for given pixel.

Initial depth set could be selected to minimize computations and the final depth could be refined by repeating the depth search for the new set of depths close to initial pixel depth. At the end of this process final depth for every pixel at reference camera position (excluding holes) is being determined and depth map is being formed. The resolution of this final depth map is typically the resolution of the reference camera.

The importance of getting accurate depth map for the generation of super-resolution images cannot be overestimated. The depth map is used to superimpose all images from the camera array onto the super resolution grid. Any error in the depth map will cause the placement of pixels from other than the reference camera in the wrong position, causing image artifacts. Usually such artifacts are more visible for areas that are closer to the cameras, resulting in big disparities, because the parallax shift for pixels corresponding to them is larger. This can be especially true when a camera array consists of mono-color R, G and B cameras, because placing a color pixel at the wrong place can be highly visible to the human eye.

However, determining final depth map using existing techniques produce depth map having the same resolution of the cameras in the camera array, which is, typically, lower than the super-resolution of output image and such low-resolution depth maps may be computationally intensive and could be very expensive both in terms of the total number of parallax computations for a large number of depths, and also due to the fact that the large number of images horn different cameras being used simultaneously puts a lot of pressure on efficient memory use. Further, the use of high-resolution camera arrays may significantly increase hardware costs as well. Furthermore, existing techniques may require using laser or Time of Flight (TOF) systems that may be expensive, too big and may result m inflexible industrial design constraints.

SUMMARY

One or more embodiments disclosed herein provide a method for generating a three dimensional (3D) image using multi-resolution camera set. In one aspect, the method includes, disposing a multi-resolution camera set including a central camera, having a first (high) resolution, and multiple camera groups, having one or more lower resolution cameras that are disposed substantially around the central camera. Images are then captured using the camera set. A resolution depth map is then generated by down scaling the captured higher resolution image to lower resolution image. Captured lower resolution images are then up-scaled. A high-resolution depth map is then using the captured image of the central camera, the up-scaled captured images of the one or more multiple camera groups, and the generated low-resolution depth map. The 3D image is then generated using the generated high-resolution depth map and the captured images.

Further embodiments of the present disclosure include a non-transitory computer-readable storage medium that includes instructions that enable a processing unit to implement one or more of the methods set forth above or the functions of the computer system set forth above. In one embodiment, a non-transitory computer-readable storage medium is provided having instructions that manage execution of a computing device. The instructions, when executed in a computing device, perform the steps for generating 3D images using multi-resolution camera groups.

Embodiments of the present disclosure provide three example implementations of multi-resolution camera groups. In the first example implementation, multiple camera groups are formed by using set of individual camera modules. In the second example implementation, individual camera modules consisting of lenses and sensors are disassembled and placed in two separate specially machined holders: one for all lenses and one for all sensors. Then these holders are aligned to insure that lenses are properly positioned on top of their sensors. This implementation could be more compact and will allow having consistent and precise positioning of lenses and sensors. In the third example implementation, which is a wafer based solution; multiple camera groups are formed by using set of different resolution lenses that are disposed substantially on top of a single wafer including a camera sensor. Overall system can consist of one or several wafer based multiple camera groups. Specific patterns of multiple camera, groups and their relative positioning for the first, second and third group implementations are also part of this disclosure. Embodiments of the present disclosure provide an embedded mobile computing device. The embedded mobile computing device includes multi-resolution camera group, a processor and memory. The memory includes a 3D image generation module, wherein the 3D image generation module is configured to generate 3D images using the multi-resolution camera group.

Further, embodiments of the present disclosure provides methods of integration of the camera groups based camera solutions as an integrated part of the current mobile devices, such as cell phones, tablets and/or laptops using resources of such devises, such as their mage Sensor Processors (TSP), General Processors, GPU and memory or they can be organized as separate units. Such separate units could be used as part of camera security systems, and/or they can be attached to Cell phones, Computers, TV, and so on using USB, wirelessly, and/or other such connectivity options.

Furthermore embodiment of this present disclosure provides techniques to organize the use of separate camera groups/modules in combination with digital single lens reflex (DSLR) cameras and high end digital still cameras (DSCs). In one embodiment, this could be accomplished by attaching camera group to DSLR using DSLR flash interface to allow DSLR camera and camera group/module to take simultaneous shots of the images using flush interface as a synchronization mechanism.

BRIEF DESCRIPTION OF THE DRAWINGS

FIGS. 3A and 3B are block diagrams illustrating another example two resolution size camera or single group camera set using radial pattern of camera positioning on a rectangular grid and as radial grid, respectively, according to an example embodiment.

FIGS. 4A to 4D are block diagrams illustrating three resolution size camera group or single group camera set using rectangular and radial pattern of camera positioning, according to an example embodiment.

FIGS. 5A to 5F are block diagram illustrating additional example multiple camera groups using radial pattern of camera positioning.

FIG. 6A is a block diagram of a three resolution size camera set using four radially positioned multiple camera groups, according to an example embodiment.

FIGS. 6B and 6C are block diagrams depicting six and eight multiple camera groups, respectively, for stereo applications, accordingly to an example embodiment.

FIGS. 8A to 8C are block diagrams of example two and three resolution multiple camera groups or a single cluster camera set formed by lenses disposed directly on top of an image sensor chip/wafer, accordingly to an example embodiment.

DETAILED DESCRIPTION

Figure 1:
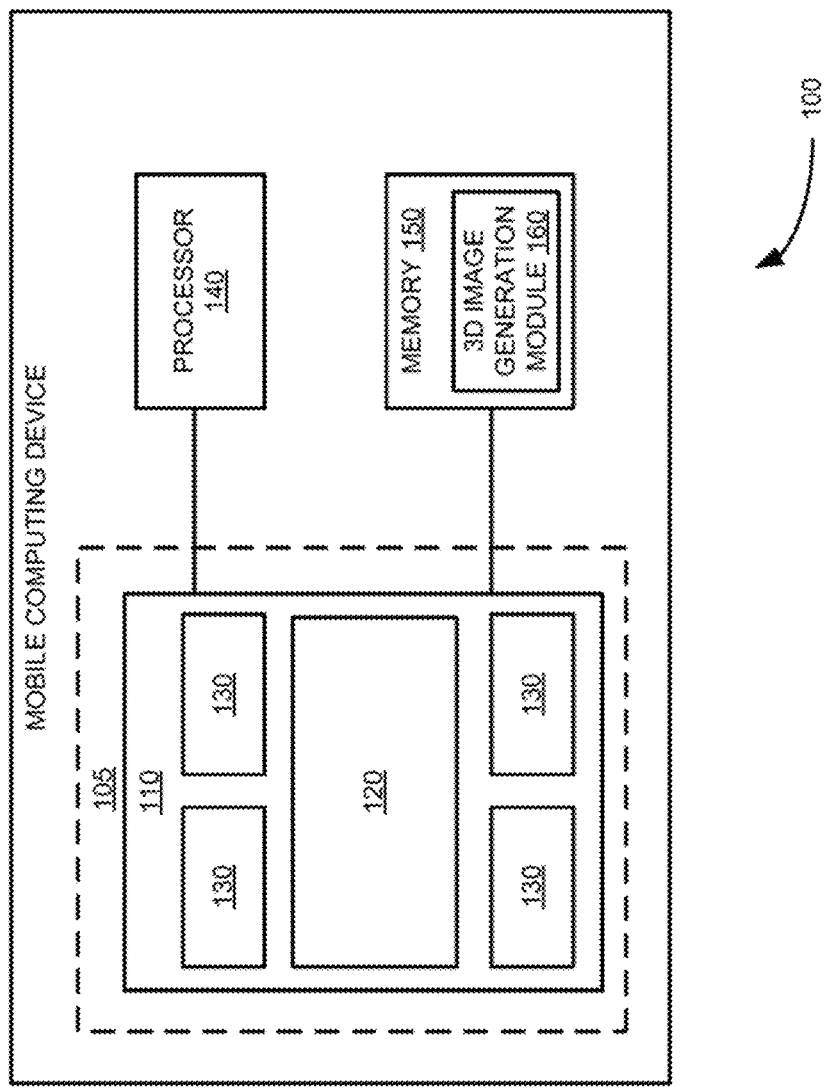
FIG. 1 is a block diagram illustrating system for generating, three-dimensional (3D) images using multi-resolution camera groups, according to an example embodiment.
Figure 2B:
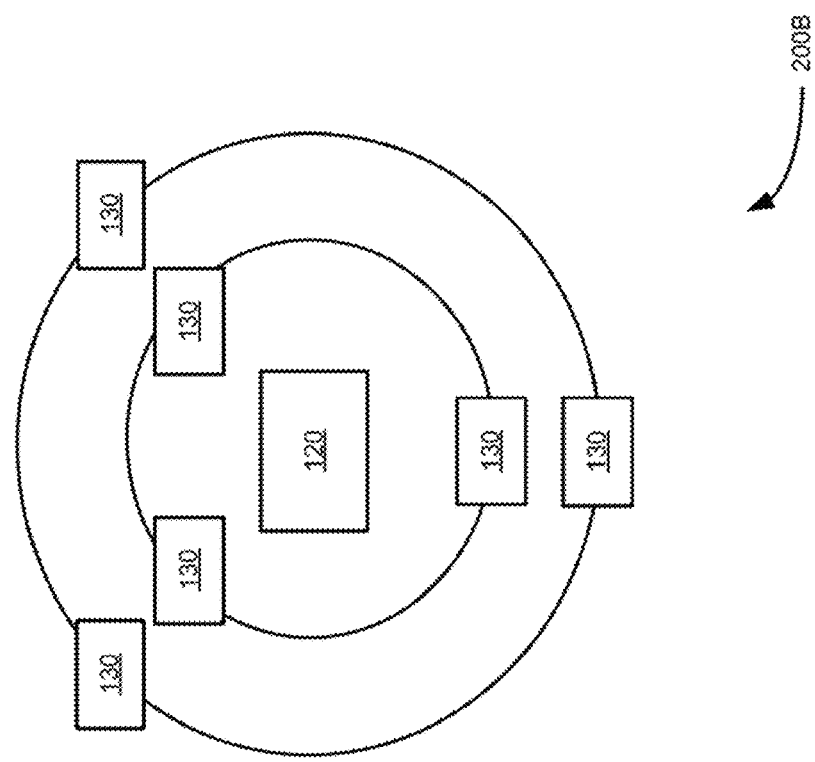
FIGS. 2A and 2B are block diagrams illustrating an example two resolution size camera, groups or single group camera set using radial pattern, according to an example embodiment.
Figure 2A:
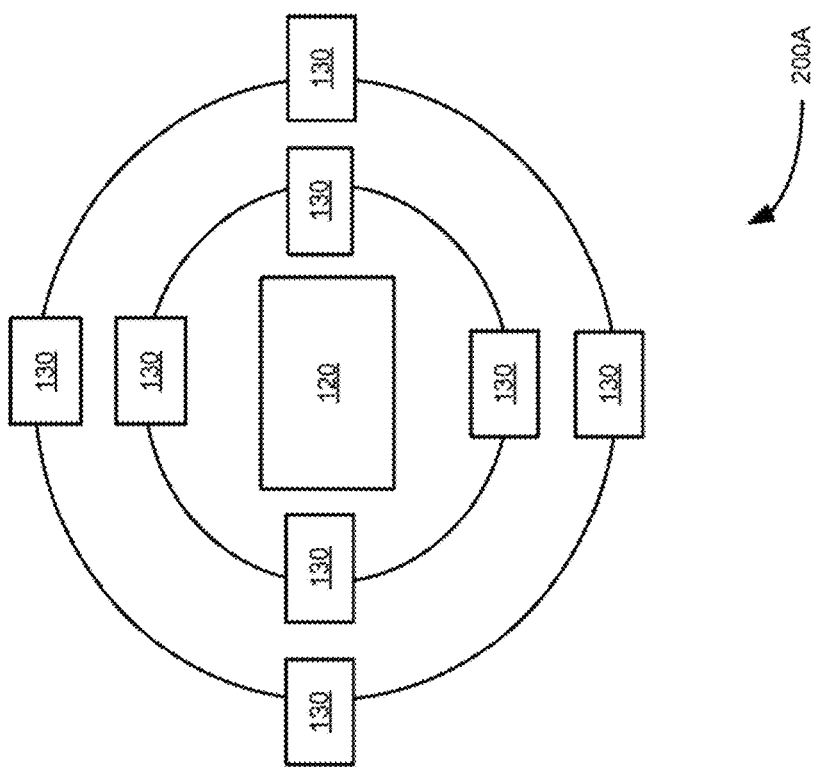
Figures 4A, 4B:
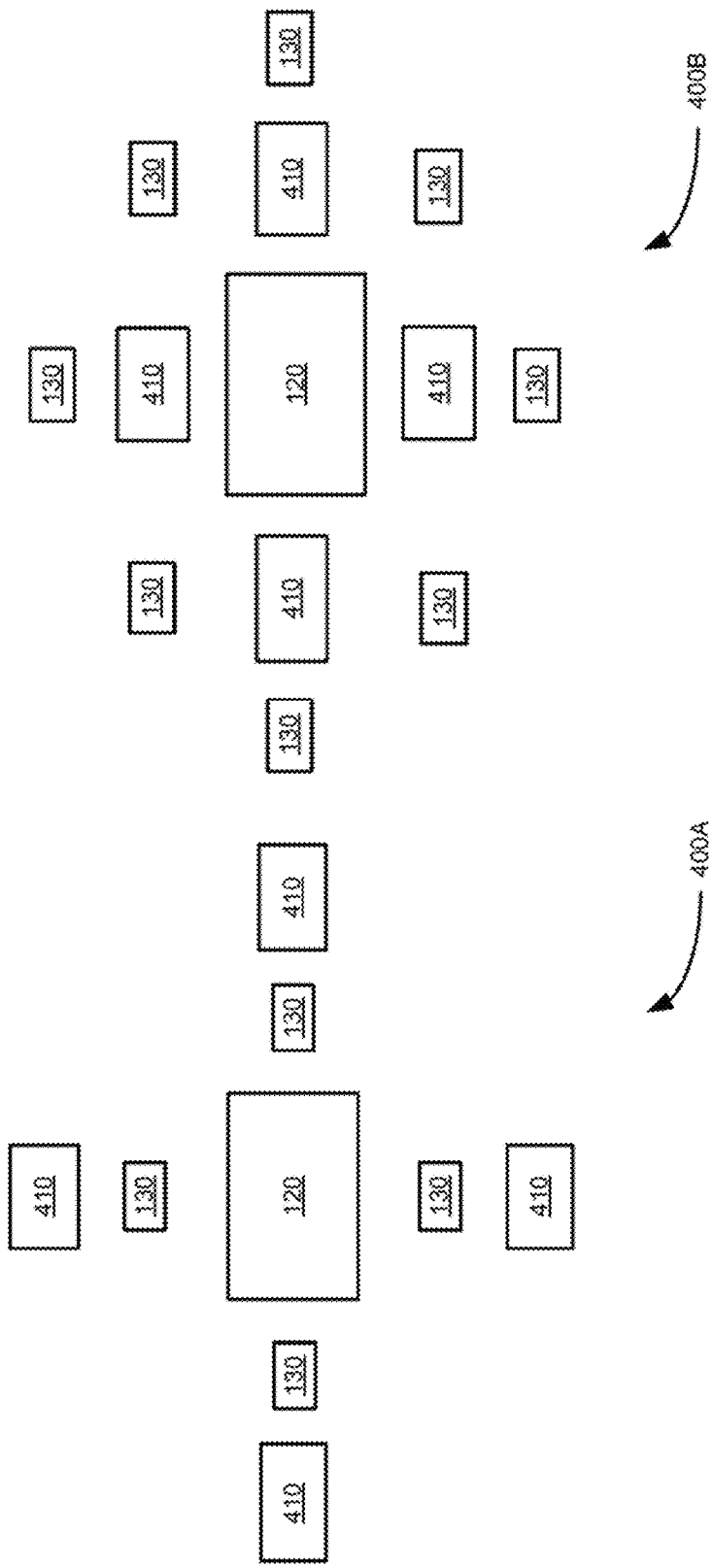
Figure 7:
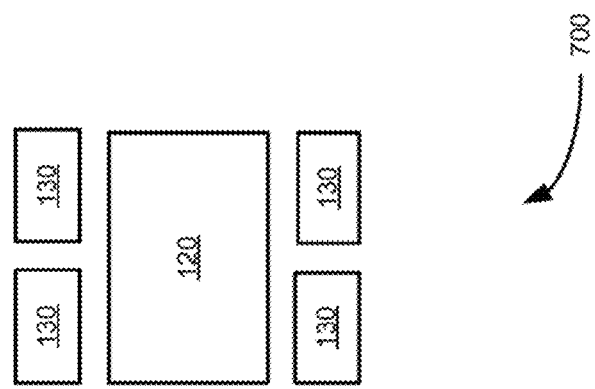
FIG. 7 is a block, diagram of a two resolution size group or single group camera set formed by lenses disposed directly on top of an image sensor chip/wafer, according, to an example embodiment.

Embodiments described herein provide a technique for generating high-resolution three-dimensional (3D) images using multi-resolution camera group. The technique minimizes hardware and processing costs associated with generating 3D images using camera array including different size cameras, such as a single or dual high-resolution cameras (big camera) surrounded by multiple lower resolution cameras (smaller cameras). The physical implementation of this technique may be accomplished in three ways. The first being s a set of individual cameras modules when each camera module consists of its own combination of lenses and image sensor. The second being a two holder solution, where individual camera modules consisting of lenses and sensors are disassembled and placed in two separate specially machined holders: one for all lenses and one for all sensors. Then these holders are aligned to insure that lenses are properly positioned on top of their sensors. This implementation could be more compact and will allow having consistent and precise positioning of lenses and sensors. The third being a "monolithic wafer solution" where multi-resolution group of lenses is being placed on the top of single large wafer and each lens from the group is being projected on its own part of the wafer. Also, the technique is configured for use in multiple application domains, as integrated solution in mobile computing devices, such as point-and-shoot cameras, laptops, tablets and mobile phones, in security cameras; as separate camera group modules devices connected to DSLR and DSC cameras using camera flash interface or wireless connections; as separate camera group modules devices connected desktop computers, televisions (TVs) or game boxes either wirelessly or using, universal serial bus (USB) or high-definition multimedia interface (HDMI).

The use of technique of multi-resolution groups optimizes generation of depth maps and occlusion determination. Furthermore, the technique provides 3D imaging platform for multitude of 3D imaging techniques and applications. In addition, the technique uses combination of RGB Bayer pattern cameras and Clear Color Cameras, where all pixels do not have color (clear) Bayer cameras could leverage existing image sensor processing (ISP) hardware. In addition, the replacements of some lower resolution RGB cameras in multiple camera groups by clear color cameras provides the following advantages: a. clear cameras provide the intensity level for every pixel and have higher effective resolution compared to RGB cameras, which require demosaicking processing by ISP resulting in lower actual resolution compared to corresponding clear code cameras in groups, which in-turn reduces both hardware costs and computations, b. clear color cameras can be used directly in depth map generation without initial color processing by ISP, which substantially reduces computations; c. clear color cameras deliver more light to the sensor's pixels than corresponding RGB cameras, which increases image quality in low light conditions.

Moreover, the "monolithic wafer solution" of multi-resolution group technique uses optical lens groups on top of monolithic sensor to greatly reduce size, power consumption, bus bandwidth and manufacturing, costs to provide a compact 3D imaging solution targeted to mobile computing devices, such as cell phones and tablets. The technique provides a wafer based camera group patterns and innovative hierarchical algorithms that are amicable to computational and power challenges for embedded computational photography applications. The technique further provides metadata for extending existing image formats for storing combined 3D and complimentary group information. The technique furthermore provides efficient 3D image generation using multiple camera groups that is amicable to a many applications, such as capturing 3D scenes using mobile devices, 3D printing, automotive and security related applications and the like.

The term "group" or "camera group" are applied with respect to a camera set consisting of cameras with different resolutions, while the camera "array" is being used to refer to a set of cameras having the same resolution.

Specific group patterns implemented using this method provide the foundation of efficient implementation for different application They reflect the balance between the overall cost of software and hardware and the resulting quality of depth maps and output image. Some applications are limited by the costs while others require higher depth map resolution and image quality. The cost of group implementation using set of individual camera modules depends on number of cameras used in the group. The higher resolution camera modules cost more than lower resolution modules. The cost of monolithic wafer solution depends on the overall size of the wafer and percentage of silicon utilization (pixel areas which actually receive lights through lenses) depends on size and specific position of lenses relative to each other. One skilled in the art can envision that the depth map resolution and image quality increases with increased number of cameras in group and their resolutions.

The use of independent camera group module with DSLR and high end DSC cameras require high quality and high-resolution depth maps. Again, one skilled in the art can envision that that the camera group module is disposed substantially close to the DSLR or DSC camera but is not obscured by its lenses. The camera group and the DSLR require making shots at the same time. Replacing DSLR flash with camera group module and attaching it to the flash connector allows using existing flash interface. DSLR flashes are n designed not to be obscured by the DSLR lenses and if group is physically positioned at the same distance from the DSLR camera as the flash module. DSLR lenses do not obscure the view of the camera group module. One or more camera group modules could also be connected to DSLR or DSC camera wirelessly and be controlled by DSLR using the same interlace as flush.

System Overview and Examples of Operation

FIG. 1 is a block diagram illustrating system for generating 3D images using multi-resolution camera groups 100, according to an example embodiment. As shown in FIG. 1, a mobile computing device 100 includes a set of multi-resolution cameras 105, a processor 140 and memory 150 that are communicatively coupled to each other. Further as shown in FIG. 1, the set of multi-resolution cameras 105 includes a central camera 120, having a first resolution, and as camera group 130, having, one or more resolutions that are lower than the first resolution and disposed substantially around the central camera 120. In the example embodiment shown in FIG. 1, the central camera 120 and the camera group 130 are formed using lenses that are disposed substantially directly on an image sensor 110 formed using a semiconductor wafer chip. In addition as shown in FIG. 1, as 3D image generation module 160 resides in the memory 150. Example multi-resolution camera set 105 including multiple camera groups are illustrated in FIGS. 2 through 8.

In operation, the 3D image generation module 160 captures images using the set of multi-resolution cameras 105. The 3D image generation module 160 then high-resolution down scales the resolution of the captured image by the central camera 120 to be substantially equal to the one of one or more resolutions associated with the multiple camera groups 130. The down-scaling process is shown in more detail in FIG. 12. In some embodiments, 3D generation module 160 generates a low-resolution depth map using the down-scaled captured image of the central camera 130 and the captured low-resolution images associated with the multiple camera groups using relatively smaller depths. The 3D generation module 160 then refines the generated low-resolution depth map. The process of refinement is shown in more detail in FIGS. 13-16. The 3D generation module 160 then up-scales the resolution of the captured images of the multiple cameras to be substantially equal to the resolution of the capture image of the central camera. The 3D generation module 160 then generates a higher resolution depth map using the captured image of the central camera, the up-scaled captured images associated with the multiple camera groups, and the refined generated low-resolution depth map. The process of generation the higher-resolution depth map is shown in detail sin FIGS. 10-11. The 3D generation module 160 then generates the 3D image from the captured images using the generated high-resolution depth map, high-resolution.

In some embodiments, the first resolution of the central camera 120 is a higher resolution than the cameras in the multiple camera groups 130. The multiple camera groups 130 have one or more resolutions that are different from the first resolution and are lower in resolution than the higher resolution of the central camera 120 as shown in FIGS. 2 to 8. Further in these embodiments, the central camera of each camera group has a higher resolution than the resolutions of the remaining cameras in the camera groups 130 as shown in FIGS. 2 to 8. In some embodiments, the multiple camera groups are substantially radially positioned around the central camera 120 as shown in FIGS. 2, 3, 4 and 8. Also in some embodiments, the central camera 120 and the multiple camera groups 130 are formed by directly disposing the camera lenses on a semiconductor water chip as shown in FIGS. 8A, 8B, and 8C.

Figure 6C:
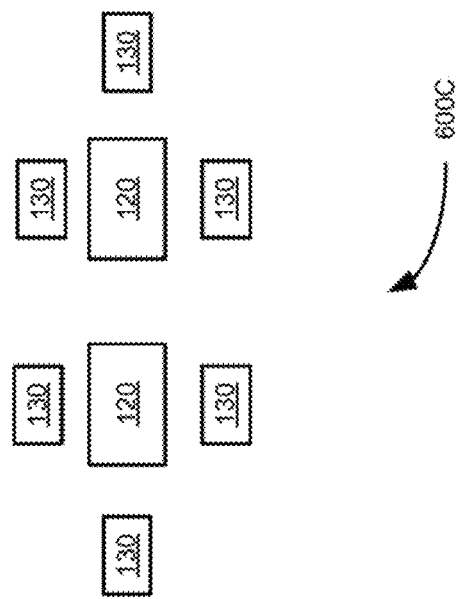

FIGS. 2-5 illustrate radial pattern multiple camera groups including two resolution camera sets which can be built using individual camera modules. FIGS. 6B and 6C illustrate a camera group having two large central cameras instead of one central camera to facilitate implementation of stereo. FIGS. 8A, 8B, and 8C illustrate monolithic wafer implementation of multiple camera groups, which are formed by disposing nine, five and thirteen lenses (810-830), respectively on wafer based image sensor. In these embodiments, the disposed lenses do not overlap with each other. In these embodiments, the circles around the lenses represent the sensor area used by lenses. For example, five lens solution shown in FIG. 8B allows to have larger individual sensor area which represent larger output resolutions, while the thirteen camera solution shown in FIG. 8C, provides a better silicon utilization and can result in a better depth map quality. The seven camera solution of FIG. 8A shows an intermediate embodiment of the embodiments shown in FIGS. 8B and 8C for completeness. The smallest cameras shown in the seven and thirteen camera solutions (FIGS. 8A and 8C) can be of clear color.

In some embodiments, the central camera 120 and the multiple camera groups 120 are disposed in a mobile computing device. Example mobile computing device are a smart phone, a tablet, a portable digital camera, a personal computer and the like.

Also, although certain terms are used primarily herein, other terms could be used interchangeably to yield equivalent embodiments and examples. For example it is well-known that equivalent terms in the field of mobile computing system or similar or related fields could be substituted for such terms as "mobile computing device," "mobile device," or the like.

Numerous specific details are set forth herein, such as data formats and code sequences and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope oldie techniques and/or functions described is not limited by the particular order, selection, or decomposition of aspects described, with reference to any particular routine, module, component, or the like.

Example Processes

Figure 9:
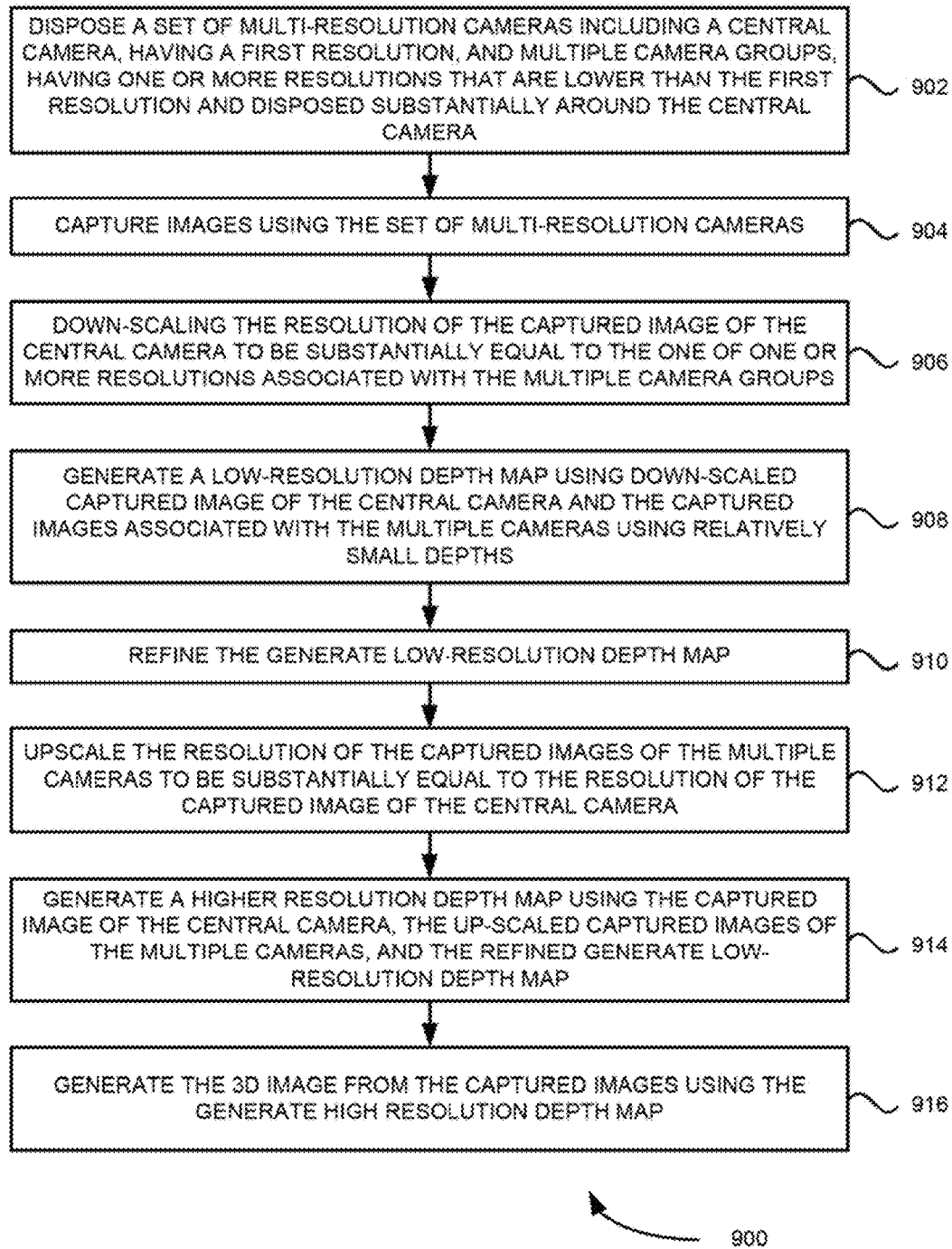
FIG. 9 is a flow diagram of process for generating 3D images using multi-resolution camera group, according to an example embodiment.

FIG. 9 is a flow diagram of process 900, for generating 3D images using multi-resolution camera set, according to an example embodiment.

Figure 10:
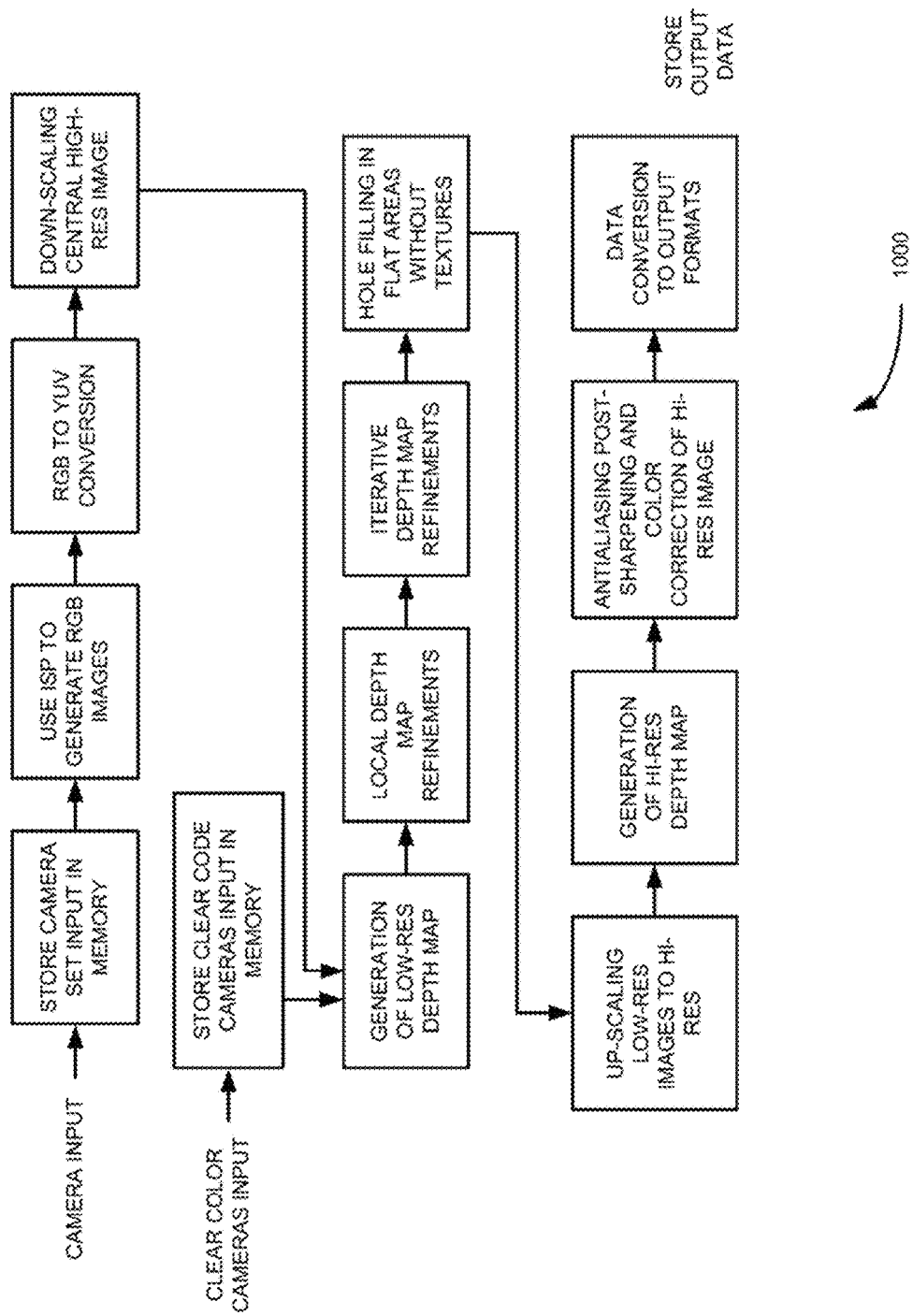
FIG. 10 is a pipe line flow diagram illustrating algorithm for generating high-resolution depth map using single or multi-resolution camera groups, according to an example embodiment.
Figure 11:
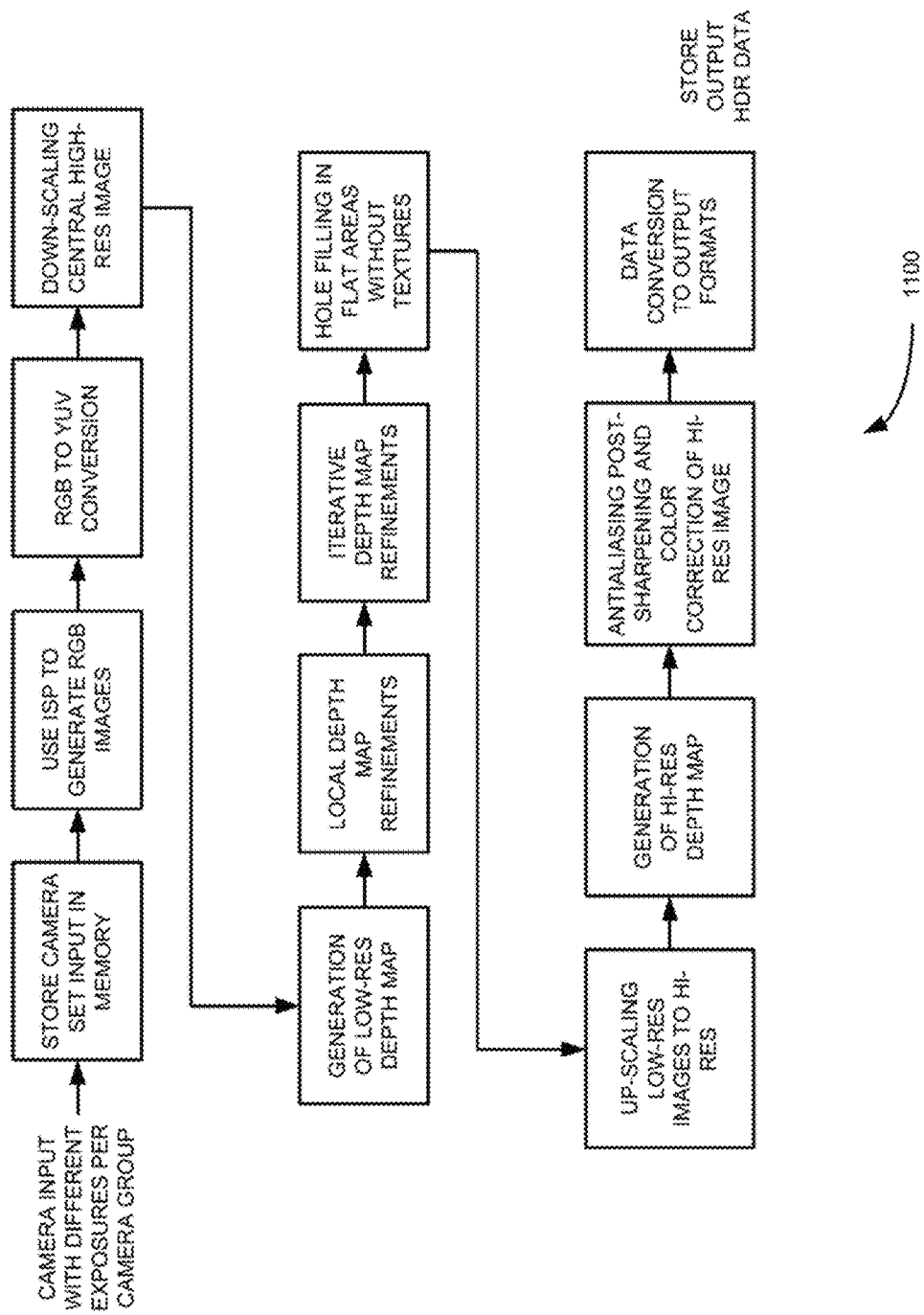
FIG. 11 is a pipe line flow diagram illustrating algorithm for generating, high-resolution depth map for high dynamic range (HDR) using single or multi-resolution camera groups, according to an example embodiment.

At block 902, process 900, disposes a set of multi-resolution cameras including a central camera, having a first resolution, and multiple camera groups, having one or more resolutions that are different from the first resolution, that are positioned substantially surrounding the central camera as shown in FIGS. 2-8. At block 904, images are captured using the disposed set of multi-resolution cameras. In these embodiments, the central camera having the first resolution has a higher resolution than the cameras in the multiple camera groups. Also in these embodiments, the multiple camera groups having the one or more resolutions that are different from the first resolution includes the camera groups having the one or more resolutions that are lower in resolution than the central camera having the higher resolution. Further in these embodiments, the central camera of each camera groups has a higher resolution than the resolutions of the remaining cameras in the camera group. Furthermore in some embodiments, the camera groups are substantially radially positioned around the central camera. The wafer based embodiments, shown in FIGS. 8A to 8C, including the central camera and the multiple camera groups are formed by directly disposing the camera lenses on a semiconductor wafer chip including an image sensor. In some embodiments, the central camera and the multiple camera groups are configured to be disposed in a mobile computing device. Example mobile computing devices are a smart phone, a tablet, a portable digital camera, a personal computer, and the like. In some embodiments, In some embodiments, for 3D high resolution mode RGB images (in Bayer pattern) in the camera set are captured at substantially the same time and stored in main memory, typically, using MINI interface. (As shown in FIGS. 10 and 11). In case a camera set also have Clear Color (transparent) cameras, their input may also be captured at substantially the same time and stored in the main memory, typically, using MIPI interface as shown in FIG. 10. Since clear code cameras have only the intensity (Luma) their output will go directly to a next block as shown in FIG. 11. Then in order to minimize power consumption the initial stage of computation pipeline may utilize existing ISP to perform de-mosaicking, and other operations required to generate RGB images for all Bayer pattern cameras. Images stored in memory are being sent to ISP one by one and the resulting RGB images will be sent back to store them in the memory as shown in FIGS. 10 and 11. The next step may convert images to YUV or YCrCb formats as shown in FIGS. 10 and 11, to use the Luma component Y as a source of depth computations in multi-camera parallax and having Chroma components playing complimentary role. It is also possible to generate YUV or YCrCb using dedicated hardware that may be already available on some of the devices as shown in FIGS. 10 and 11.

At block 906, the resolution of the captured image by the central camera is down-scaled to be substantially equal to the one of one or more resolutions associated with the cameras in the multiple camera groups. In some embodiments, the hierarchical approach includes computing low-resolution depth maps using captured images associated with multiple camera clusters having lower resolution in the camera set using relatively small depths. The computed low-resolution depth maps are then refined. A high-resolution depth map is then computed using the captured images associated with the central camera and central cameras of each of the multiple camera clusters and the refined computed low-resolution depth maps. The down-scaling process is shown in more detail in the flowchart of FIG. 12.

In some embodiments, in order to minimize the amount of depth map computations at the initial stage of depth map generation by down scaling the high resolution of depth map is being downscaled to low resolution to match the resolution of surrounding images. Generally, it is desirable from computational point of view to have low resolution images, i.e., about half of the resolution of a high resolution image. The next stage is to use multi-view parallax techniques to compute depth map for every pixel visible by two or more cameras. This may be done by computing parallax shift for every depth using all cameras from which the particular pixel is visible and finding a best match. At this stage pixels that are not seen by any of the cameras are determined and excluded from computations. The use of partial summations and computations along the Epipolar lines will further assist to reduce total amount of needed computations and to can make the final result much more accurate.

Figure 12:
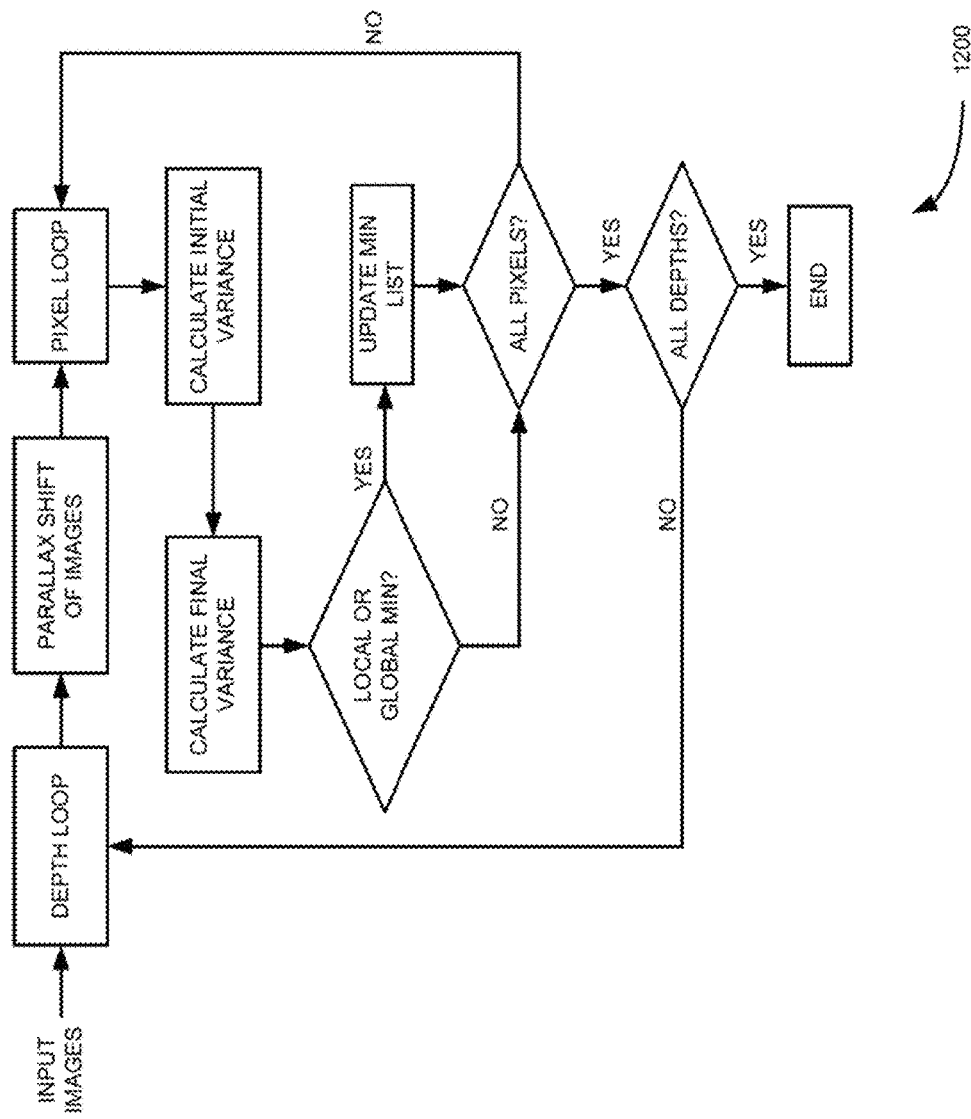
FIG. 12 is a flow diagram of process for generating low-resolution depth map for the pipe line algorithm, such as those shown in FIGS. 11 and 12, according to an example embodiment.
Figure 13:
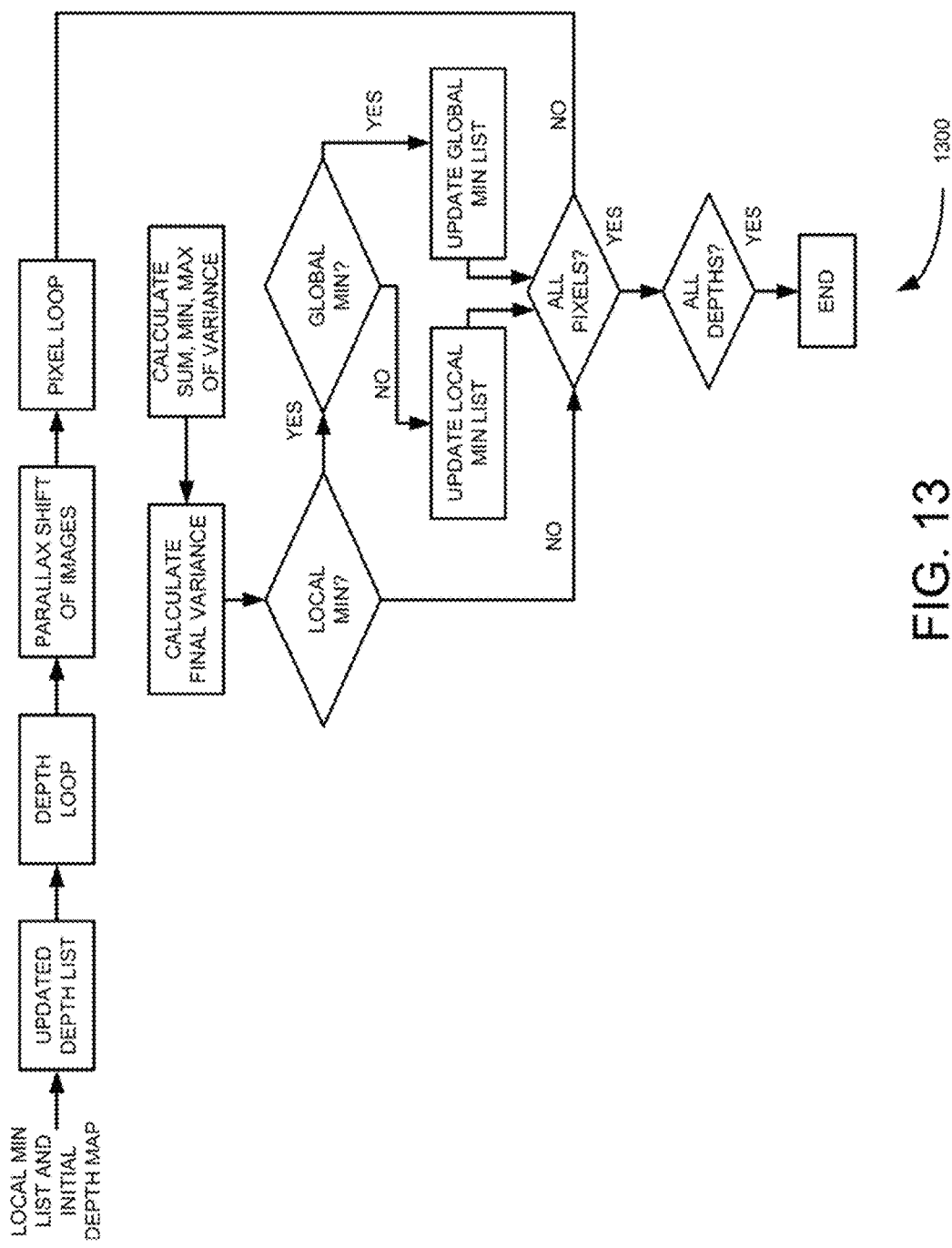
FIG. 13 is a flow diagram of process for depth map refinements for the pipe line algorithm, such as those in FIGS. 11 and 12, according to an example embodiment.
Figure 14:
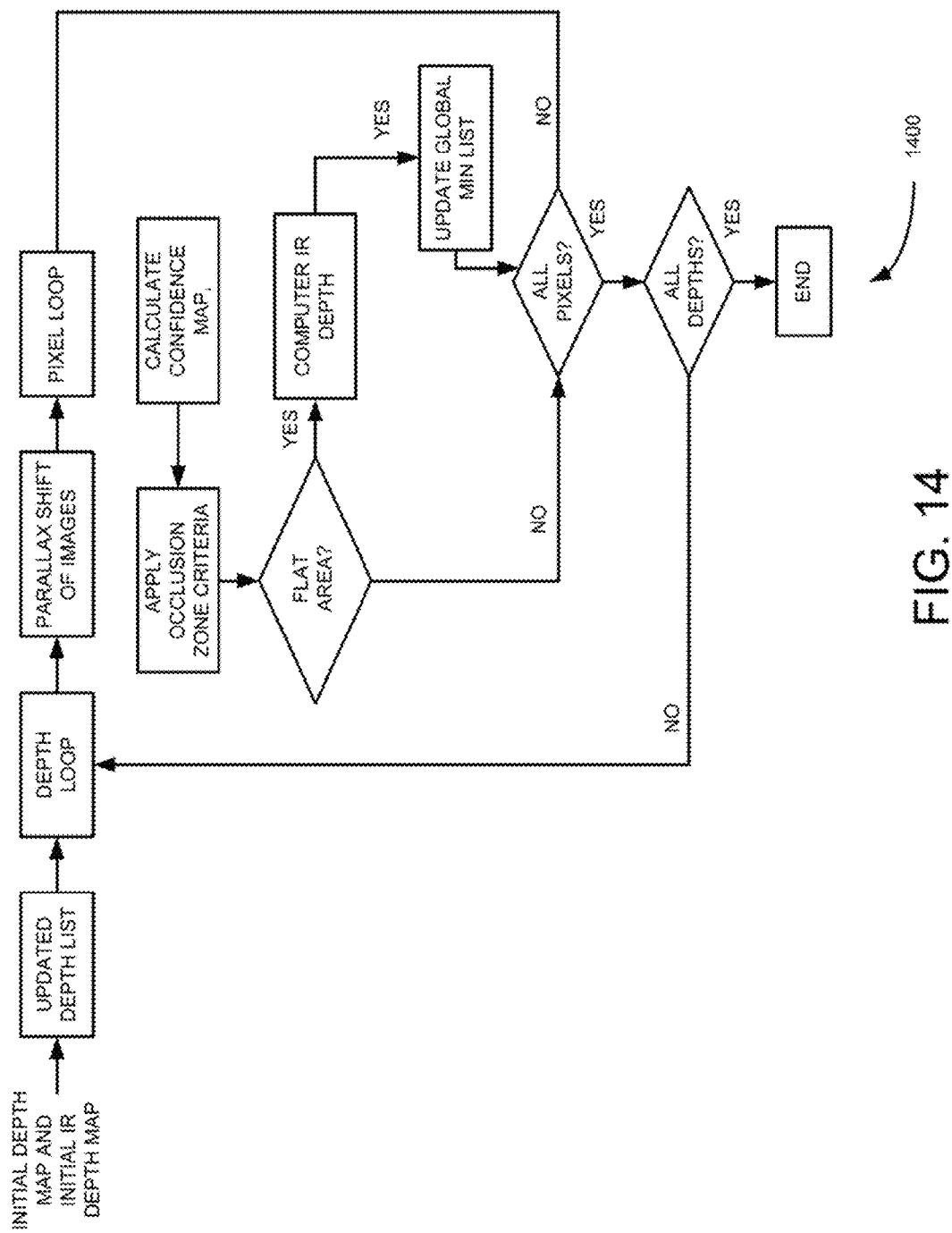
FIG. 14 is a flow diagram of process for depth map refinements using infra-red active texturing for the pipe line algorithm, such as those shown in FIGS. 11 and 12, according to an example embodiment.

Furthermore in some embodiments, the parallax shift for all pixels in all images are performed to match corresponding pixels in reference image, because parallax shift is proportional to inverse distance to the camera, and also for using inverse distances (disparities) in the depth map computations. Parallax shift may also depend on distance between cameras and it can be constant for a given camera at a given depth. FIGS. 12-14 illustrate initial depth generation. Also because at this stage of computation actual depth is not knows and this operation is performed for all depths in the initial depth set as shown in FIGS. 10 and 11. Based on a given, depth parallax shift of all image is performed to generate these shifted images as shown in FIGS. 10 and 11. The next step in the computation is to find a best match for every pixel in reference image in the neighborhoods for all images in order to find the best matching pattern. Typically, neighborhoods could be made of 3×3 or 5×5 pixels. Actual pattern matching may be done by computing the sum of variances between corresponding pixels of reference image and other Images. Further in these computations, minimum and maximum deltas between reference and other pixels in the neighborhood are determined as shown in FIGS. 10 and 11. Then for each pixel, minimum and maximum deltas are discarded and the final Variance is recomputed as shown in FIGS. 10 and 11. All pixels depths for two previous depth levels are stored and minimum list is maintained for each pixel which contains global and local minimum variances. Variance of current depth is checked for global minimum and variance of previous depth for local as shown in FIGS. 10 and 11. Depth with global minimum value is used as a pixel depth for the depth map. Depths from local minimum list are used as input in depth map refinements algorithm as shown in FIGS. 10 and 11. The above described process is repeated until all pixels are processed for all depths in initial depth set.

At block 908, a low-resolution depth map is generated using the down-scaled captured image of the central camera and the captured images associated with the multiple camera groups using relatively small depths.

In one example embodiment, multi-view parallax techniques are used to compute depth map for each pixel visible by two or more cameras. This may be done by computing parallax shift for every depth using all cameras from which the particular pixel is visible and finding a best possible match. At this stage, cameras that do not see these pixels are exclude from computations for a given pixel. The use of partial summations and computations along the Epipolar lines may reduce total amount of computations needed to make the final result more accurate. In this example embodiment, all of the initial parallax computations are performed using intensity Y color component as shown in FIGS. 10 and 11.

In another example embodiment, parallax shift for all pixels in all images are performed to match corresponding pixels in reference image. Because parallax shift is proportional to inverse distance to the camera, inverse distances (disparities) are used in the depth map computations. Parallax shift may also depend on distance between cameras and may be constant for given camera at given depth. FIG. 14 illustrates initial depth generation. Initially actual depth may not be known and therefore, operation for all depths in the initial depth set are performed as shown in first block of FIG. 14. For a given depth, parallax shift of all image is performed and shifted images are generated as shown in second block of FIG. 14. Then for every pixel in reference image, a possible best match of this pixel in the neighborhoods are determined for all images in order to find the best matching, pattern. Typically, the neighborhoods could be of size 3×3 or 5×5 pixels as shown in the third block of FIG. 14. Actual pattern matching may be done by computing a sum of variances between corresponding pixels of reference and other images. During these computations. Min and Max deltas between reference and other pixels in the neighborhood are determined as shown in the fifth block of FIG. 14. Then for each pixel Min and Max deltas are discarded and the final variance is recomputed as shown in sixth block of FIG. 14. All pixels depths for two previous depth levels are stored and a Min list is maintained for each pixel, which contains global and local Min variances. Variance of current depth for global Min and variance of previous depth for local are checked as shown in sixth block of FIG. 14. Depth with global Min value is used as a pixel depth for the depth map. Depths from local depth Min list are used as input to depth map refinements algorithm. Min list is computed as shown in the seventh block of FIG. 14. The above described above process is repeated until all pixels for all depths in initial depth set are computed.

At block 910, the generated low-resolution depth map is refined. In one example embodiment, at this stage the above refinements of the global depth may not be sufficient because in some instances the refinements of the local Min depths may produce actual Global depths. This algorithm is shown in more detail in FIG. 15. Starting with local depth list and an updated depth list containing number of additional depths around local min depths are created. The algorithm described is then repeated for the updated depth list.

Further in this example embodiment, iterative depth map refinements may be performed at low resolution. Iterative depth map refinement may be performed if there is single cluster implementation, otherwise this algorithm may be applied at high resolution. The depth map refinements may be performed on the edges of neighborhoods. Source to Noise Ratio (SNR) may be used to define these areas. Special attention may be used to "silhouette" edges i.e., the edges where there is a jump in depth between different sides of the edge. The presence of silhouette edges may be also an indication that there could be an occlusion zones for some cameras. This algorithm is shown in more detail in FIG. 16. The input to this algorithm are low resolution images down-scaled central image and refined depth map. The depth map refinement may include for one or more iterations. Each iteration may include processing all pixels in the reference image. For each pixel in the reference image SNR is computed. The SNR block size may be 5×5 or 7×7. The camera calibration data, camera noise model and a pre-defined threshold may be used, which are specific for a particular vendor and vendor's model, SNR is then compared to threshold, and if SNR value to particular pixel is above the threshold then parallax warping of pixels in the neighborhood of reference image may be performed using current depth map to all other images and compute corresponding variances as shown in FIG. 12. If variance for one or more images is substantially higher then variance for other images, then it may be concluded that the images in this particular pixel is occluded and pixel's depth value is recomputed by excluding occluded pixels as shown in FIG. 12 and the depth value in the depth map stored. After refining all pixels, the above process is repeated in the next iteration using the updated depth map.

Because depth map for these areas may not be defined, where depths are defined, one of the extrapolation methods may be chosen for moving inward from the boundary of these areas. At this stage, one skilled in the art may use any number well known operations, such as a sliding window operation on computed depth map. The window may be of 3×3 or 5×5 pixels in size. This same process may be used to fill depths in occlusion areas. Extrapolation methods, such as methods active texturing for the clusters may be used as an alternative to hole filling, which may have infra-red cameras and overall system may have active light source for texturing.

In some embodiments, during generation of depth map, particular areas of the image having flat areas without textures and depth are determined for all pixels in such areas. This may be performed by computing a confidence map. The confidence map could have low value for two reasons, one being flat areas without texture and the other being occlusion zone. The occlusion zone in low confidence maps areas may be removed by using several separate groups of cameras and when some of them have high confidence values the y may not be used in active light texturing. For the remaining areas, the commutation of depth maps may be performed by using infra-red cameras and further using the same depth map generation algorithm. The results of active lite texturing are up-scaled and then all pixels in flat areas without textures are replaced by these values. Due to relatively low resolution, depth map using active illumination could be computed for all pixels parallel to regular depth map. Up-scaling and pixel replacements may be performed in flat areas.

At block 912, the resolution of the captured images of the multiple camera groups is up-scaled to be substantially equal to the resolution of the captured image of the central camera. In an example embodiment, well known up-scaling methods to one skilled in the art may be used on the target system. Example well-known up-scaling methods are bilinear up-scaling, bicubic up-scaling, polyphase up-scaling, custom up-scaling and the like. The quality of final depth map may depend on the quality of up-scaling based on type of chosen up-scaling algorithm. In addition to up-scaling low-resolution images, low resolution depth map may also be up-scaled using the same up-scaling algorithm.

At block 914, a higher resolution depth map is generated using the captured image of the central camera, the up-scaled captured images of the multiple camera groups, and the refined generated low-resolution depth map. The algorithm for generation of high resolution depth map may use up-scaled low resolution images and/or up-scaled low resolution depth map. In these example embodiments, the algorithm for higher resolution depth map is essentially the same as the generation of low resolution depth map and uses up-scaled low resolution depth map, up-scaled low resolution images and/or central high resolution image as shown in FIGS. 10 and 11.

At block 916, the 3D image of the captured image is then generated using the generated high-resolution depth map and the captured images. In one example embodiment, the captured images are 2D captured images.

Figure 15:
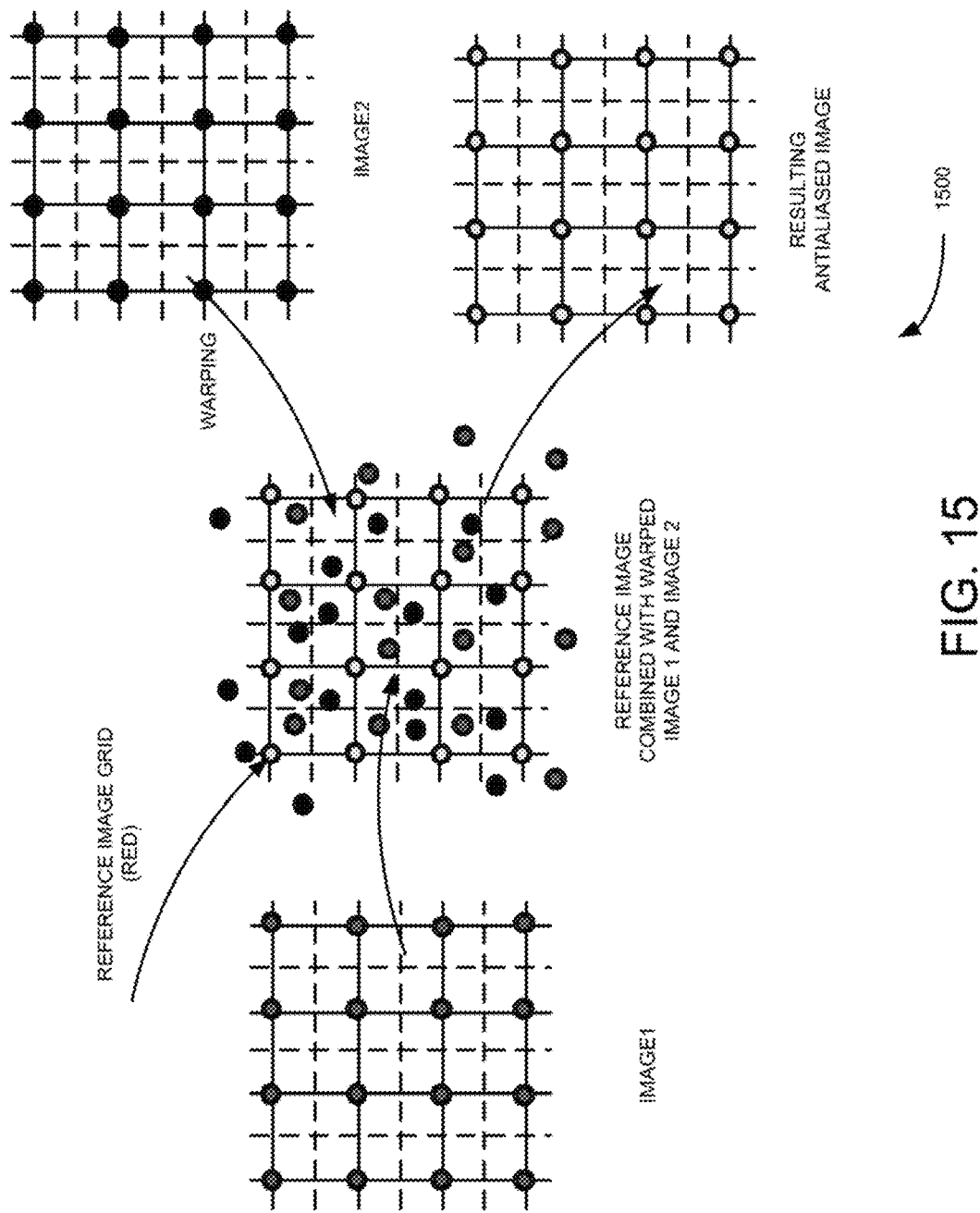
FIG. 15 is a block diagram illustrating antialiasing application to generated depth map using the pipe line algorithm, such as those shown in FIGS. 11 and 12, according to an example embodiment.
Figure 16:
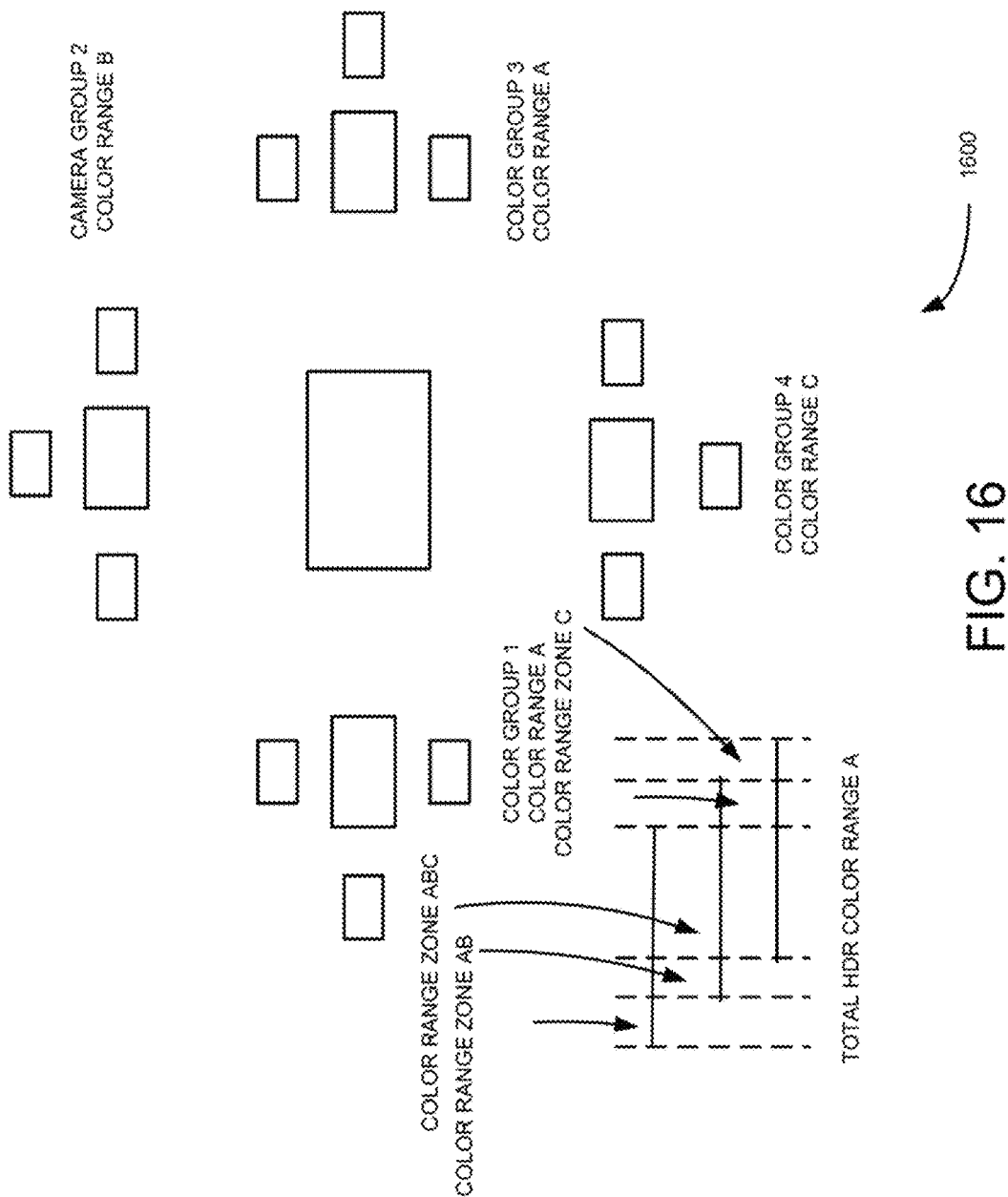
FIG. 16 is a block diagram illustrating application of HDR parallax color range selection to generated depth map using the pipe line algorithm, such as those shown in FIGS. 11 and 12, according to an example embodiment.

In some embodiments, using final depth map warp for all up-sampled Images all pixels into Reference image using antialiasing process illustrated in FIG. 15. Complimentary structure to hold values of the pixels are created which are placed into area of particular reference pixel together with distance to pixel center. Then normalized weighted sum included reference pixel is computed for each pixel in the reference image. Reference pixel may have a much higher weight than warped pixels. The weight be computed based on the distance from the center.

In some embodiments, well known post-sharpening methods to one skilled in the art (such as bilateral filters) may be used on the target system. Also in some embodiments, well known color correction methods to one skilled in cart (tone curves) may be used on the target system.

Further in some embodiments, during generation of depth map, which particular areas of the image having flat areas without textures depth are determined for all pixels in such areas. This may be performed by computing a confidence map. The confidence map could have loss value for two reasons, one being flat areas without texture and the other being occlusion zone. The occlusion zone in low confidence maps areas may be removed by using several separate groups of cameras and when some of them have high confidence values then we do not use them in active light texturing. For the remaining areas the commutation of depth maps are performed by using infra-red cameras only the same using the same depth map generation algorithm. The results of active lite texturing are up-scaled and then all pixels in flat areas without textures may be replaced by these values. Due to relatively low resolution, depth map using active illumination could be computed for all pixels parallel to the normal depth map. Up-scaling and pixel replacements may be performed in flat areas.

In some embodiments, the multi-resolution camera set is disposed on a flash of a DSLR or a high end DSC and further configured to use flash interface to produce synchronized shots from the multi-resolution camera set disposed on the DSLR camera and/or the high end DSC.

Process 900 for generating 3D images using multi-resolution camera set is also explained above with reference to the system diagram 100 shown in FIG. 1.

In an example embodiment, components/modules of 3D image generation module 60 are implemented using standard programming techniques. In other embodiments, 3D image generation module may be implemented as instructions processed by a processor that executes as one of other programs.

Furthermore, in some embodiments, some or all of the components of 3D image generation module 160 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

Further, from the foregoing it will be appreciated that, although specific embodiments have been described herein for purposes of illustration, various modifications may be made without deviating from the spirit and scope of this disclosure. For example, the methods, techniques, and systems for optimizing guest OS utilization cost in a processor based licensing model in a virtualized datacenter are applicable to other architectures or m other settings. For example, the described techniques may be employed as part of a cloud-based computing resource offering, wherein customers ma pay to have higher importance levels associated with their activities, m order to obtain higher levels of service or availability. As another example, the described techniques may be employed to allocate resources or schedule CPU time at the process level within an operating system. Also, the methods, techniques, and systems discussed herein are applicable to differing protocols, communication media (optical, wireless, cable, etc.) and devices desktop computers, wireless handsets, electronic organizers, personal digital assistants, tablet computers, portable email machines, game machines, pagers, navigation devices, etc.).

The invention claimed is:

1. A method for generating a three-dimensional (3D) image using a multi-resolution camera set, comprising:

disposing a set of multi-resolution cameras including a central camera, having a first resolution, and multiple camera groups, having one or more resolutions that are lower than the first resolution, substantially around the central camera, wherein the multiple camera groups include a combination of red-green-blue (RGB) Bayer pattern cameras and clear color cameras;

capturing images using the set of multi-resolution cameras;

generating YUV and/or YCrCb format for each pixel associated with the captured images of the multiple camera groups;

down-scaling the resolution of the captured image of the central camera to be substantially equal to the one of one or more resolutions associated with the cameras of the multiple camera groups;

generating a low-resolution depth map using all pixels in the down-scaled captured image of the central camera, and luma and chroma components in the YUV and/or YCrCb format of the captured images associated with the multiple camera groups using relatively small depths by performing a parallax warping and computing corresponding variances on neighboring pixels of each pixel and obtaining a global Min depth value for every pixel as pixel depths;

refining the generated low-resolution depth map by using, for every pixel, obtain global Min depth values as pixel depths, and further computing updated global Min depth values using current depth values and additional new depth values around current depth values, and replacing old global Min depth values with the updated global Min depth values, which creates a number of new depths in the updated refined depth map, wherein the generated low-resolution depth map is iteratively refined using the replaced updated global Min depth values;

upscaling the resolution of the captured images of the multiple camera groups to be substantially equal to the resolution of the captured image of the central camera;

generating a higher resolution depth map by performing a parallax warping and computing corresponding variances on neighboring pixels of each pixel in the captured image of the central camera, the up-scaled captured images of the multiple camera groups, and the iteratively refined generated low-resolution depth map;

refining the generated higher resolution depth map by using, for every pixel, obtain global Min depth values as pixel depths, and further computing updated global Min depth values using current depth values and additional new depth values around current depth values, and replacing old global Min depth values with the updated global Min depth values, which creates a number of new depths in the updated refined depth map, wherein the generated higher resolution depth map is iteratively refined using the replaced updated global Min depth values; and generating the 3D image of the captured image using the generated high-resolution depth map and the captured images.

2. The method of claim 1, wherein the central camera having the first resolution comprises the central camera having a higher resolution than the cameras in the multiple camera groups.

3. The method of claim 2, wherein the multiple camera groups having the one or more resolutions that are different from the first resolution comprises the camera group having the one or more resolutions that are lower resolution than the central camera having the higher resolution.

4. The method of claim 3, wherein a central camera of each camera group having a higher resolution than the resolutions of the remaining cameras in the multiple camera groups.

5. The method of claim 1, wherein the camera groups are radially positioned substantially around the central camera.

6. The method of claim 1, where in the central camera and the multiple camera groups are formed by directly disposing the camera lenses on a semiconductor wafer chip.

7. The method of claim 1, wherein the central camera and the multiple camera groups are disposed in a mobile computing device.

8. The method of claim 1, wherein the mobile computing device comprises a smart phone, a tablet, a portable digital camera, and/or a personal computer.

9. The method of claim 1, wherein the set of multi-resolution cameras are disposed on a flash of DSLR or a high end DSC and further configured to use flash interface to produce synchronized shots from the set of multi-resolution cameras disposed on the DSLR camera and/or the high end DSC.

10. A non-transitory computer-readable storage medium including instructions that are configured, when executed by a computing system, to perform a method for generating a 3D image using set of multi-resolution cameras, the method comprising:
disposing a set of multi-resolution cameras including a central camera, having a first resolution, and multiple camera groups, having one or more resolutions that are different from the first resolution, substantially surrounding the central camera, wherein the multiple camera groups include a combination of red-green-blue (RGB) Bayer pattern cameras and clear color cameras;
capturing images using the set of multi-resolution cameras;
generating YUV and/or YCrCb format for each pixel associated with the captured images of the multiple camera groups;
down-scaling the resolution of the captured image of the central camera to be substantially equal to the one of one or more resolutions associated with the multiple camera groups;
generating a low-resolution depth map using all pixels in the down-scaled captured image of the central camera, and luma and chroma components in the YUV and/or YCrCb format of the captured images associated with the multiple camera groups using relatively small depths by performing a parallax warping and computing corresponding variances on neighboring pixels of each pixel and obtaining a global Min depth value for every pixel as pixel depths;
refining the generated low-resolution depth map by using, for every pixel, obtain global Min depth values as pixel depths, and further computing updated global Min depth values using current depth values and additional new depth values around current depth values, and replacing old global Min depth values with the updated global Min depth values, which creates a number of new depths in the updated refined depth map, wherein the generated low-resolution depth map is iteratively refined using the replaced updated global Min depth values;
upscaling the resolution of the captured images of the multiple camera groups to be substantially equal to the resolution of the captured image of the central camera;
generating a higher resolution depth map by performing a parallax warping and computing corresponding variances on neighboring pixels of each pixel in the captured image of the central camera, the up-scaled captured images of the multiple camera groups, and the iteratively refined generated low-resolution depth map;
refining the generated higher resolution depth map by using, for every pixel, obtain global Min depth values as pixel depths, and further computing updated global Min depth values using current depth values and additional new depth values around current depth values, and replacing old global Min depth values with the updated global Min depth values, which creates a number of new depths in the updated refined depth map, wherein the generated higher resolution depth map is iteratively refined using the replaced updated global Min depth values; and
generating the 3D image of the captured image using the generated high-resolution depth map and the captured images.

11. The non-transitory computer-readable storage medium of claim 10, wherein the central camera having the first resolution comprises the central camera having a higher resolution than the camera groups in the multiple camera groups.

12. The non-transitory computer-readable storage medium of claim 11, wherein the multiple camera groups having the one or more resolutions that are different from the first resolution comprises the camera group having the one or more resolutions that are lower resolution than the central camera having the higher resolution.

13. The non-transitory computer-readable storage medium of claim 12, wherein a central camera of each camera group having a higher resolution than the resolutions of the remaining cameras in the multiple camera groups.

14. The non-transitory computer-readable storage medium of claim 10, wherein the camera groups are radially positioned substantially around the central camera.

15. A mobile computing device for generating a 3D image using multi-resolution camera set, the system comprising:
a set of multi-resolution cameras;
a processor coupled to the set of multi-resolution cameras, wherein the set of multi-resolution cameras includes a central camera, having a first resolution, and multiple camera groups, having one or more resolutions that are different from the first resolution, that are positioned substantially surrounding the central camera, wherein the multiple camera groups include a combination of red-green-blue (RGB) Bayer pattern cameras and clear color cameras; and
memory coupled to the processor, and wherein the memory includes a 3D image generation module, and it is configured to:
capture images using the set of multi-resolution cameras;
generate YUV and/or YCrCb format for each pixel associated with the captured images of the multiple camera groups;

down-scale the resolution of the captured image of the central camera to be substantially equal to the one of one or more resolutions associated with the multiple camera groups;

generate a low-resolution depth map using all pixels in the down-scaled captured image of the central camera, and luma and chroma components in the YUV and/or YCrCb format of the captured images associated with the multiple camera groups using relatively small depths by performing a parallax warping and computing corresponding variances on neighboring pixels of each pixel and obtaining a global Min depth value for every pixel as pixel depths;

refine the generated low-resolution depth map by using, for every pixel, obtain global Min depth values as pixel depths, and further computing updated global Min depth values using current depth values and additional new depth values around current depth values, and replacing old global Min depth values with the updated global Min depth values, which creates a number of new depths in the updated refined depth map, wherein the generated low-resolution depth map is iteratively refined using the replaced updated global Min depth values;

upscale the resolution of the captured images of the multiple camera groups to be substantially equal to the resolution of the captured image of the central camera;

generate a higher resolution depth map by performing a parallax warping and computing corresponding variances on neighboring pixels of each pixel in the captured image of the central camera, the up-scaled captured images of the multiple camera groups, and the iteratively refined generated low-resolution depth map;

refine the generated higher resolution depth map by using, for every pixel, obtain global Min depth values as pixel depths, and further computing updated global Min depth values using current depth values and additional new depth values around current depth values, and replacing old global Min depth values with the updated global Min depth values, which creates a number of new depths in the updated refined depth map, wherein the generated higher resolution depth map is iteratively refined using the replaced updated global Min depth values; and generate the 3D image of the captured image using the generated high-resolution depth map and the captured images.

16. The mobile computing device of claim 15, wherein the central camera having the first resolution comprises the central camera having a higher resolution than the cameras in the multiple camera groups.

17. The mobile computing device of claim 16, wherein the multiple camera groups having the one or more resolutions that are different from the first resolution comprises the camera group having the one or more resolutions that are lower resolution than the central camera having the higher resolution.

18. The mobile computing device of claim 17, wherein a central camera of each camera group having a higher resolution than the resolutions of the remaining cameras in the multiple camera groups.

19. The mobile computing device of claim 15, wherein the camera groups are radially positioned substantially around the central camera.

20. The mobile computing device of claim 15, wherein the set of multi-resolution cameras including the multiple camera groups are formed by using a set of individual camera modules.

21. The mobile computing device of claim 15, where in the central camera and the multiple camera groups are formed by directly disposing the camera lenses on a semiconductor wafer chip.

22. The mobile computing device of claim 15, wherein the multiple camera groups are formed by placing disassembled lenses and sensors in two separate machined holders.

23. The mobile computing device of claim 15, wherein the central camera and the multiple camera groups are disposed in a mobile computing device.

24. The mobile computing device of claim 15, wherein the mobile computing device comprises a smart phone, a tablet, a portable digital camera, and/or a personal computer.

25. The mobile computing device of claim 15, wherein the set of multi-resolution cameras is disposed on a flash of DSLR or a high end DSC and further configured to use flash interface to produce synchronized shots from the set of multi-resolution cameras disposed on the DSLR camera and/or the high end DSC.

26. The mobile computing device of claim 15, wherein the captured images are 2D captured images.

27. The method of claim 1, wherein the one or more resolutions of the multiple camera groups comprise a second resolution and a third resolution, wherein the multiple camera groups having the second resolution are radially positioned substantially around the central camera with an angular separation of 90 degrees between the multiple camera groups.

28. The method of claim 1, wherein the one or more resolutions of the multiple camera groups comprise a second resolution and a third resolution, wherein the multiple camera groups having the second resolution are radially positioned substantially around the central camera with an angular separation of 120 degrees between the multiple camera groups.

29. The method of claim 1, wherein the one or more resolutions of the multiple camera groups comprise a second resolution and a third resolution, wherein the multiple camera groups having the second resolution are positioned in three radial directions as a subset within a rectangular grid around the central camera.

30. The method of claim 1, wherein the one or more resolutions of the multiple camera groups comprises a second resolution and a third resolution, wherein the multiple camera groups having the second resolution and the third resolution are positioned radially around the central camera with an angular separation of 45 degrees between the multiple camera groups.

31. The method of claim 1, wherein the one or more resolutions of the multiple camera groups comprises a second resolution and a third resolution, wherein the multiple camera groups having the second resolution and the third resolution are positioned radially around the central camera with an angular separation of 90 degrees between the multiple camera groups.

32. The method of claim 1, wherein the multi-resolution cameras include a second central camera, and wherein the central camera and the second central camera are positioned next to each other and the multiple camera groups are positioned around the central cameras.

33. The method of claim 4, wherein the multiple camera groups comprise four groups, wherein each group is radially positioned around the central camera with an angular separation of 90 degrees between the groups.

34. The mobile computing device of claim 15, wherein the one or more resolutions of the multiple camera groups comprise a second resolution and a third resolution, wherein the multiple camera groups having the second resolution are radially positioned substantially around the central camera with an angular separation of 90 degrees between the multiple camera groups.

35. The mobile computing device of claim 15, wherein the one or more resolutions of the multiple camera groups comprise a second resolution and a third resolution, wherein the multiple camera groups having the second resolution are radially positioned substantially around the central camera with an angular separation of 120 degrees between the multiple camera groups.

36. The mobile computing device of claim 15, wherein the one or more resolutions of the multiple camera groups comprise a second resolution and a third resolution, wherein the multiple camera groups having the second resolution are positioned using three radial directions as a subset within a rectangular grid around the central camera.

37. The mobile computing device of claim 15, wherein the one or more resolutions of the multiple camera groups comprises a second resolution and a third resolution, wherein the multiple camera groups having the second resolution and the third resolution are positioned radially around the central camera with an angular separation of 45 degrees between the multiple camera groups.

38. The mobile computing device of claim 15, wherein the one or more resolutions of the multiple camera groups comprises a second resolution and a third resolution, wherein the multiple camera groups having the second resolution and the third resolution are positioned radially around the central camera with an angular separation of 90 degrees between the multiple camera groups.

39. The mobile computing device of claim 15, wherein the multi-resolution cameras include a second central camera, and wherein the central camera and the second central camera are positioned next to each other and the multiple camera groups are positioned around the central cameras.

40. The mobile computing device of claim 18, wherein the multiple camera groups comprise four groups, wherein each group is radially positioned around the central camera with an angular separation of 90 degrees between the groups.

* * * * *